US012222721B2

United States Patent
Udagawa et al.

(10) Patent No.: US 12,222,721 B2
(45) Date of Patent: Feb. 11, 2025

(54) AUTONOMOUS WORK MACHINE, AUTONOMOUS WORK MACHINE CONTROL METHOD, AND STORAGE MEDIUM

(71) Applicant: HONDA MOTOR CO., LTD., Tokyo (JP)

(72) Inventors: Takamasa Udagawa, Wako (JP); Makoto Yamamura, Wako (JP); Hiroto Takahashi, Wako (JP); Masaya Honji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 386 days.

(21) Appl. No.: 17/577,916

(22) Filed: Jan. 18, 2022

(65) Prior Publication Data
US 2022/0137632 A1    May 5, 2022

Related U.S. Application Data

(63) Continuation of application No. PCT/JP2019/028902, filed on Jul. 23, 2019.

(51) Int. Cl.
*G05D 1/00* (2024.01)

(52) U.S. Cl.
CPC ......... *G05D 1/0214* (2013.01); *G05D 1/0251* (2013.01)

(58) Field of Classification Search
CPC .......................... G05D 1/0214; G05D 1/0251
See application file for complete search history.

(56) References Cited

U.S. PATENT DOCUMENTS

| | | |
|---|---|---|
| 8,239,084 B2 | 8/2012 | Yamamoto et al. |
| 9,298,188 B2 | 3/2016 | Kini et al. |
| 9,497,901 B2 | 11/2016 | Willgert |
| 9,603,300 B2 | 3/2017 | Pettersson |
| 9,868,211 B2 | 1/2018 | Williams et al. |
| 10,222,797 B2 | 3/2019 | Yamamura et al. |

(Continued)

FOREIGN PATENT DOCUMENTS

| | | |
|---|---|---|
| EP | 3079030 A1 | 10/2016 |
| JP | H03-071313 A | 3/1991 |

(Continued)

OTHER PUBLICATIONS

International Search Report and Written Opinion for PCT/JP2019/028902 mailed Oct. 21, 2019.

(Continued)

*Primary Examiner* — Aaron L Troost
(74) *Attorney, Agent, or Firm* — Thomas | Horstemeyer, LLP

(57) ABSTRACT

An autonomous work machine that works in a work area, comprising: a detection unit that detects a plurality of markers arranged to define the work area; a specifying unit that specifies marker information based on a detection result of the detection unit; a setting unit that sets a virtual line connecting the plurality of markers based on the marker information specified by the specifying unit; and a control unit that controls the autonomous work machine such that the autonomous work machine does not deviate to a region beyond the virtual line set by the setting unit.

26 Claims, 14 Drawing Sheets

(56) References Cited

U.S. PATENT DOCUMENTS

| | | |
|---|---|---|
| 10,639,793 B2 | 5/2020 | Williams et al. |
| 11,057,752 B2 | 7/2021 | Yamamoto et al. |
| 11,356,822 B2 | 6/2022 | Yamamoto et al. |
| 11,465,284 B2 | 10/2022 | Williams et al. |
| 2009/0028387 A1 | 1/2009 | Jeong et al. |
| 2010/0235033 A1 | 9/2010 | Yamamoto et al. |
| 2014/0214237 A1 | 7/2014 | Kini et al. |
| 2015/0163993 A1 | 6/2015 | Pettersson |
| 2015/0201555 A1 | 7/2015 | Willgert |
| 2016/0282866 A1 | 9/2016 | Yamamura et al. |
| 2016/0297072 A1 | 10/2016 | Williams et al. |
| 2018/0065253 A1* | 3/2018 | Williams ............ G05D 1/0234 |
| 2019/0098468 A1 | 3/2019 | Yamamoto et al. |
| 2020/0064857 A1* | 2/2020 | Gagne ................ G05D 1/0088 |
| 2020/0121888 A1 | 4/2020 | Haneda et al. |
| 2020/0238520 A1 | 7/2020 | Williams et al. |
| 2021/0018927 A1* | 1/2021 | Ackerman .......... G05D 1/0278 |
| 2021/0132624 A1* | 5/2021 | Andriolo ........... G01C 21/3837 |
| 2021/0250738 A1 | 8/2021 | Yamamoto et al. |
| 2021/0373562 A1* | 12/2021 | Bousani ............. G05D 1/0274 |
| 2023/0064687 A1 | 3/2023 | Williams et al. |

FOREIGN PATENT DOCUMENTS

| | | |
|---|---|---|
| JP | 2007-094743 A | 4/2007 |
| JP | 2007-213293 A | 8/2007 |
| JP | 2008-065755 A | 3/2008 |
| JP | 2009-184059 A | 8/2009 |
| JP | 2016-186748 A | 10/2016 |
| JP | 2017-091246 A | 5/2017 |
| JP | 2017-107456 A | 6/2017 |
| JP | 2017-158532 A | 9/2017 |
| JP | 2019-004792 A | 1/2019 |
| WO | 2017/187881 A1 | 11/2017 |
| WO | 2018/123598 A1 | 7/2018 |
| WO | 2019/009164 A1 | 1/2019 |
| WO | 2019/124225 A1 | 6/2019 |
| WO | 2021/014586 A1 | 1/2021 |

OTHER PUBLICATIONS

Extended European Search Report for European Patent Application No. 19938953.7 mailed Apr. 11, 2023.
Japanese Office Action for Japanese Patent Application No. 2021-534463 mailed Jul. 18, 2023 (partially translated).

* cited by examiner

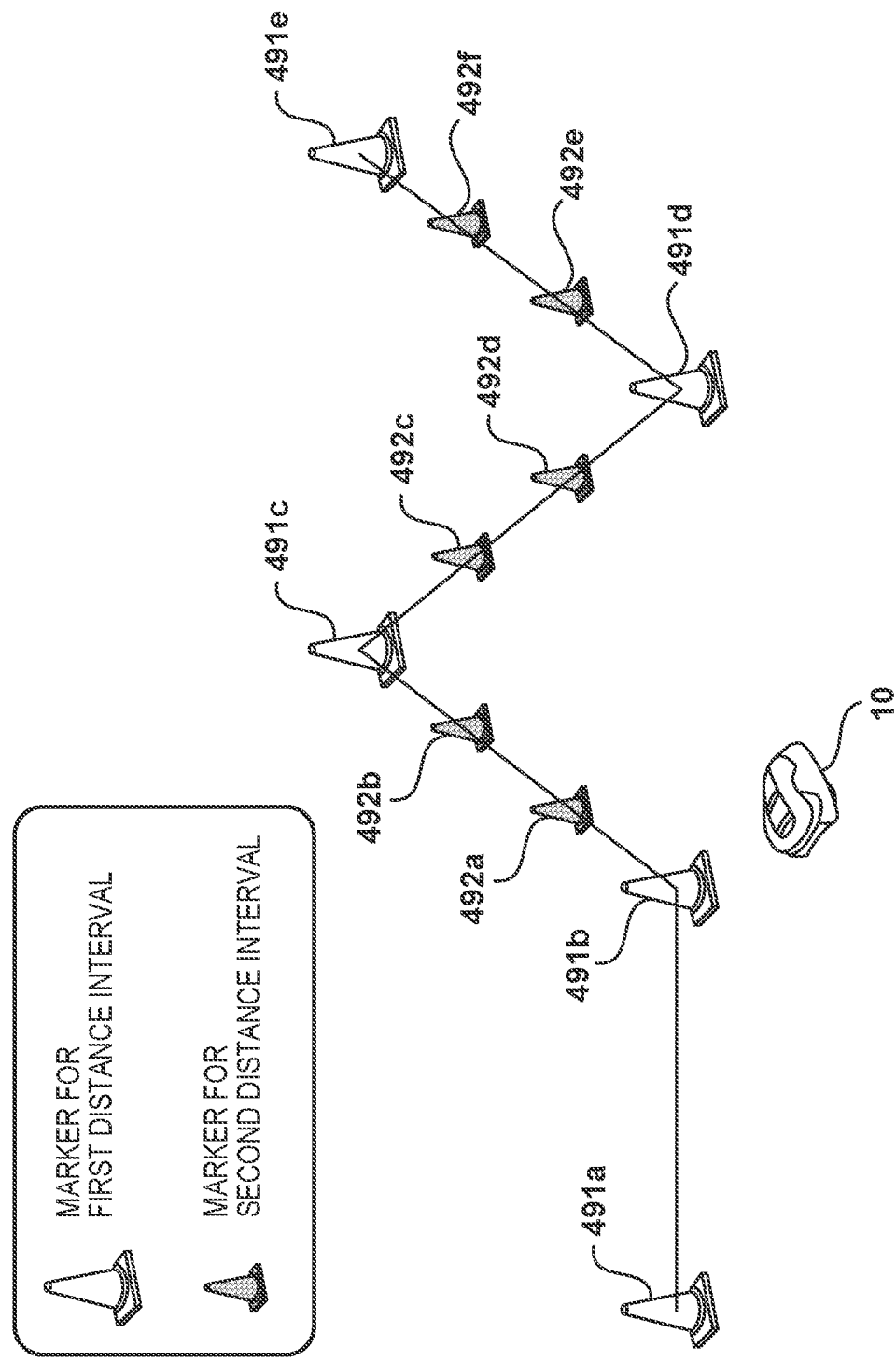

AUTONOMOUS WORK MACHINE, AUTONOMOUS WORK MACHINE CONTROL METHOD, AND STORAGE MEDIUM

CROSS-REFERENCE TO RELATED APPLICATION(S)

This application is a continuation of International Patent Application No. PCT/JP2019/028902 filed on Jul. 23, 2019, the entire disclosure of which is incorporated herein by reference.

BACKGROUND OF THE INVENTION

Field of the Invention

The present invention relates to an autonomous work machine, an autonomous work machine control method, and a storage medium.

Description of the Related Art

PTL 1 discloses that when a marker is recognized, position information of the marker stored in a robot vehicle is read to grasp a current position of the robot vehicle.

CITATION LIST

Patent Literature

PTL 1: U.S. Pat. No. 9,497,901

However, in the technique described in PTL 1, it is necessary to prepare a plurality of different markers that can be distinguished from each other, and there is a problem that the procurement cost of the markers increases.

The present invention has been made in view of the above problem, and the present invention provides a technique for controlling a work machine using markers that do not need to be individually distinguished.

SUMMARY OF THE INVENTION

According to one aspect of the present invention, there is provided an autonomous work machine according to the present invention is an autonomous work machine that works in a work area and is including a detection unit that detects a plurality of markers arranged to define the work area, a specifying unit that specifies marker information based on a detection result of the detection unit, a setting unit that sets a virtual line connecting the plurality of markers based on the marker information specified by the specifying unit, and a control unit that controls the autonomous work machine such that the autonomous work machine does not deviate to a region beyond the virtual line set by the setting unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4G is an explanatory diagram of a method for determining adjacent markers according to an embodiment of the present invention.

DESCRIPTION OF THE EMBODIMENTS

Figure 1:
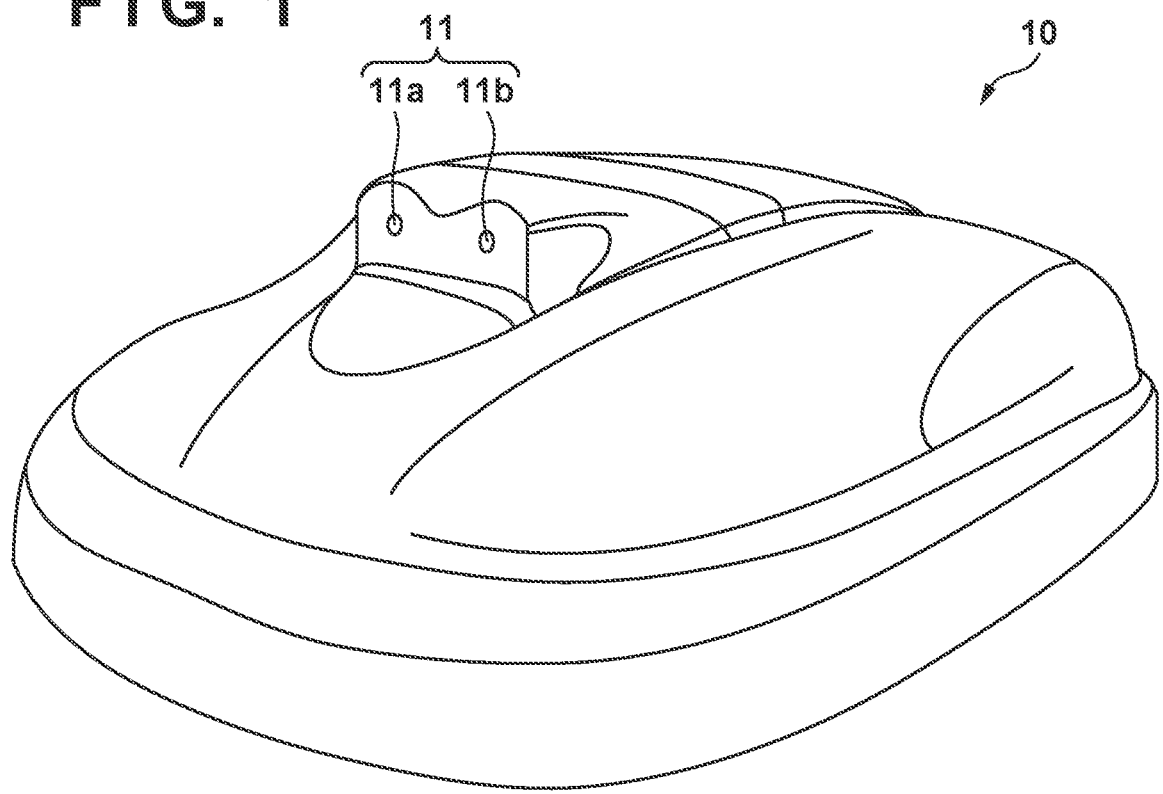
FIG. 1 is an external view of a work machine capable of autonomously traveling according to an embodiment of the present invention.

Hereinafter, embodiments of the present invention will be described with reference to the accompanying drawings. Note that the same components are denoted by the same reference numerals throughout the drawings.

First Embodiment

FIG. 1 is an external view of an autonomous work machine capable of autonomously traveling according to an embodiment of the present invention. Hereinafter, a moving direction (vehicle length direction), a lateral direction (vehicle width direction) orthogonal to the moving direction, and a vertical direction orthogonal to the moving direction and the lateral direction in a side view of the autonomous work machine are respectively defined as a front-and-rear direction, a left-and-right direction, and an up-and-down direction, and the configuration of each part will be described in accordance with the above definition.

<Configuration of Autonomous Work Machine>

In FIG. 1, reference numeral 10 denotes an autonomous work machine (hereinafter referred to as a "work vehicle"). Specifically, the work vehicle 10 functions as a lawn mower that autonomously travels. However, the lawn mower is merely an example, and the present invention is also applicable to other types of work machines. The work vehicle 10 includes a camera unit 11 including a plurality of cameras (a first camera 11a and a second camera 11b), and calculates and acquires distance information between an object existing forward and the work vehicle 10 using images captured by the first camera 11a and the second camera 11b having parallax. Then, the operation of the work vehicle 10 is controlled based on the captured image and the object recognition model held in advance.

Figure 2:
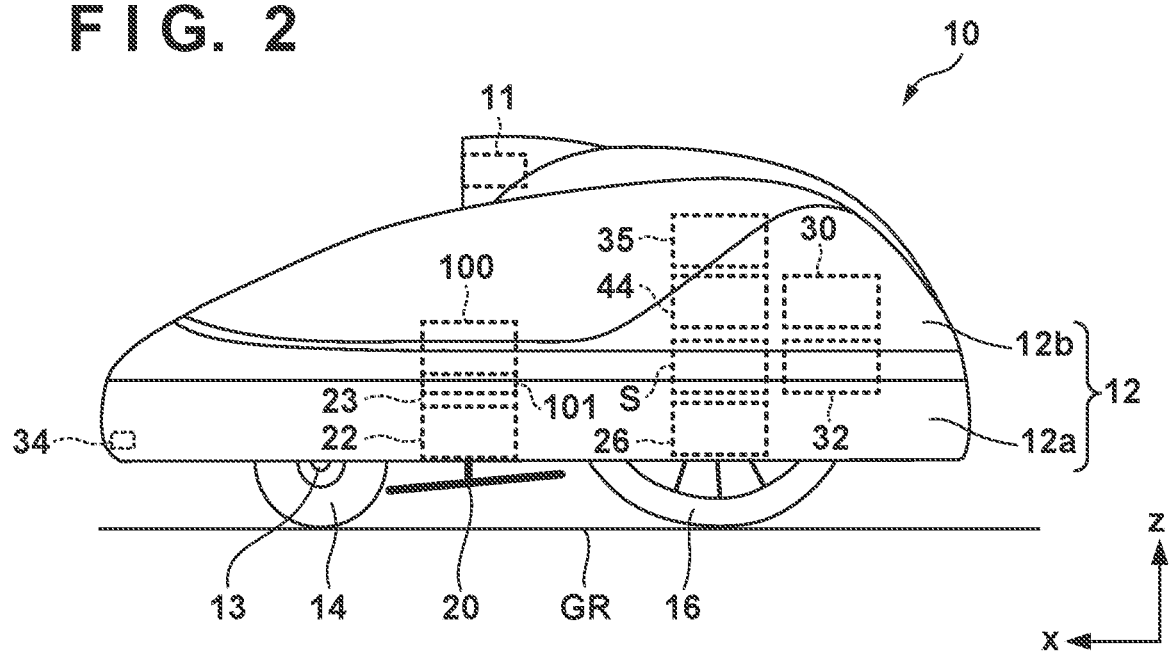
FIG. 2 is a diagram illustrating the work machine according to an embodiment of the present invention as viewed from the side.

FIG. 2 is a diagram illustrating the work vehicle 10 observed in the lateral direction (vehicle width direction). As illustrated in FIG. 2, the work vehicle 10 includes the camera unit 11, a vehicle body 12, a stay 13, front wheels 14, rear wheels 16, a blade 20, a work motor 22, a motor holding member 23, a blade-height adjustment motor 100, and a translation mechanism 101. The work vehicle 10 further includes a travel motor 26, a group of various sensors S, an electronic control unit (ECU) 44, a charging unit 30, a battery 32, a charging terminal 34, and a communication unit 35.

The vehicle body 12 of the work vehicle 10 includes a chassis 12a, and a frame 12b attached to the chassis 12a. The front wheels 14 include one left wheel and one right wheel each having a smaller diameter and fixed to the front of the chassis 12a through the stay 13 in the front-and-rear direction. The rear wheels 16 include one left wheel and one right wheel each having a larger diameter and attached to the rear of the chassis 12a.

The blade 20 is a rotary blade for a lawn mowing work, and is attached near the central position of the chassis 12a. The work motor 22 is an electric motor disposed above the blade 20. The blade 20 is connected with the work motor 22, and is rotatably driven by the work motor 22. The motor holding member 23 holds the work motor 22. The motor holding member 23 is restricted in rotation with respect to the chassis 12a, and is allowed to move in the up-and-down direction by, for example, the combination of a guide rail and a slider movable up and down while being guided by the guide rail.

The blade-height adjustment motor 100 is a motor for adjusting the height in the up-and-down direction of the blade 20 to the ground surface GR. The translation mechanism 101 is connected to the blade-height adjustment motor 100, and is a mechanism for converting rotation of the blade-height adjustment motor 100 into translation in the up-and-down direction. The translation mechanism 101 is also connected with the motor holding member 23 that holds the work motor 22.

The rotation of the blade-height adjustment motor 100 is converted into the translation (movement in the up-and-down direction) by the translation mechanism 101, and the translation is transmitted to the motor holding member 23. Due to the translation (movement in the up-and-down direction) of the motor holding member 23, the work motor 22 held by the motor holding member 23 also is translated (moves in the up-and-down direction). Due to the movement in the up-and-down direction of the work motor 22, the height of the blade 20 with respect to the ground surface GR is adjustable.

The travel motor 26 is two electric motors (prime movers) attached to the chassis 12a of the work vehicle 10. The two electric motors are connected one-to-one to the left and right rear wheels 16. By independently rotating the left and right wheels forward (rotating in the forward direction) or backward (rotating in the backward direction) with the front wheels 14 as driven wheels and the rear wheels 16 as driving wheels, the work vehicle 10 can be moved in various directions.

The charging terminal 34 is a charging terminal provided at a front end position in the front-and-rear direction of the frame 12b, and is connected with a corresponding terminal of a charging station (for example, a charging station 300 that will be described later with reference to FIG. 3) to receive electric power supplied from the charging station. The charging terminal 34 is connected with the charging unit 30 through wiring, and the charging unit 30 is connected with the battery 32. In addition, the work motor 22, the travel motor 26, and the blade-height adjustment motor 100 are connected to the battery 32, and are supplied with power from the battery 32.

An ECU 44 is an electronic control unit including a microcomputer formed on a circuit board and controls the operation of the work vehicle 10. The details of the ECU 44 will be described later. The communication unit 35 can transmit and receive information to and from an external device (for example, a charging station that will be described later, a communication terminal possessed by a user, a remote controller for operating the work vehicle 10, or the like) connected with the work vehicle 10 in a wired or wireless manner.

Figure 3:
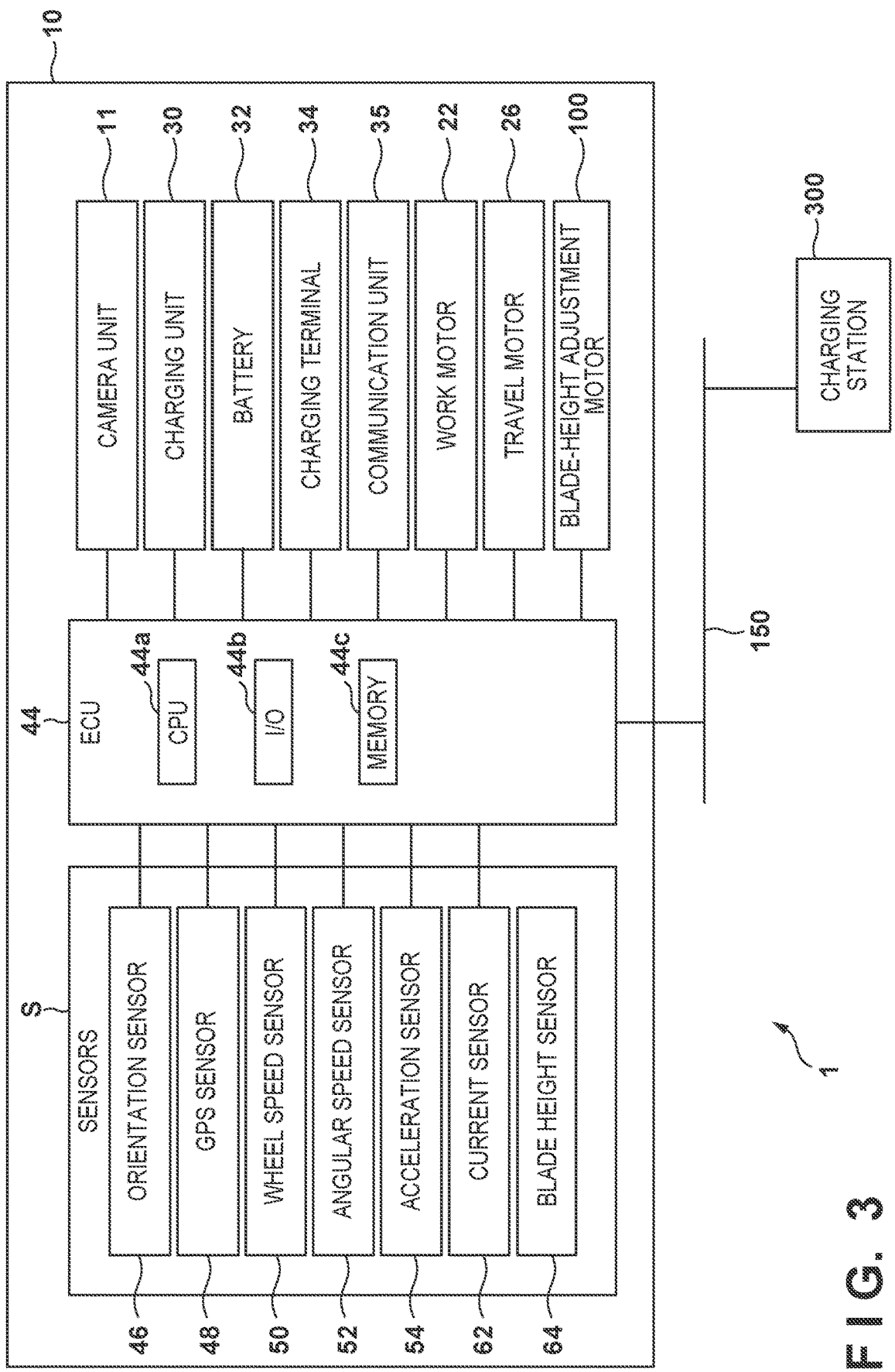
FIG. 3 is a diagram illustrating a configuration example of a control system according to an embodiment of the present invention.

FIG. 3 is a diagram illustrating a configuration example of a control system according to an embodiment of the present invention. A control system 1 includes the work vehicle 10 and the charging station 300. Note that a remote controller for operating a communication terminal possessed by a user that will be described later or the work vehicle 10 may be further included.

As illustrated in FIG. 3, the ECU 44 included in the work vehicle 10 includes a CPU 44a, an I/O 44b, and a memory 44c. The I/O 44b inputs and outputs various types of information. The memory 44c is a read-only memory (ROM), an electrically erasable programmable read-only memory (EEPROM), a random access memory (RAM), or the like. The memory 44c stores a captured image, a work schedule of the work vehicle 10, map information on a work area, various programs for controlling the operation of the work vehicle 10, and the like. In order to operate each processing unit for achieving the present invention, the ECU 44 reads and executes a program stored in the memory 44c.

The ECU 44 is connected with the group of various sensors S. The sensor group S includes an orientation sensor 46, a GPS sensor 48, a wheel speed sensor 50, an angular speed sensor 52, an acceleration sensor 54, a current sensor 62, and a blade height sensor 64.

The orientation sensor 46 and the GPS sensor 48 are sensors for acquiring information on the orientation and position of the work vehicle 10. The orientation sensor 46 detects the orientation in accordance with terrestrial magnetism. The GPS sensor 48 receives a radio wave from a GPS satellite and detects information indicating a current position (latitude and longitude) of the work vehicle 10. To be noted, in addition to or instead of the GPS sensor 48 and the orientation sensor 46, odometry and an inertial measurement unit (IMU) may be provided.

The wheel speed sensor 50, the angular speed sensor 52, and the acceleration sensor 54 are sensors for acquiring information regarding a moving state of the work vehicle 10. The wheel speed sensor 50 detects the wheel speeds of the left and right rear wheels 16. The angular speed sensor 52 detects an angular speed around an axis in the up-and-down direction (z axis in the vertical direction) of the gravity center position of the work vehicle 10. The acceleration sensor 54 detects accelerations in the 3 orthogonally triaxial directions of x, y, and z axes acting on the autonomous work vehicle 10.

The current sensor 62 detects the current consumption (amount of power consumption) of the battery 32. The detection result of the current consumption (amount of power consumption) is stored in the memory 44c of the ECU 44. In a case where a predetermined amount of power is consumed and the amount of power stored in the battery 32 becomes not more than a threshold, the ECU 44 performs returning control for causing the autonomous work vehicle 10 to return to the charging station 300 for charging. Note that a daily work schedule may be stored in the memory 44c, and the returning control may be performed in response to completion of work to be performed on that day.

The blade height sensor 64 detects a height of the blade 20 with respect to a ground surface GR. The detection result of the blade height sensor 64 is output to the ECU 44. On the basis of the control of the ECU 44, the blade-height adjustment motor 100 is driven and the blade 20 moves up and down in the up-and-down direction to adjust the height from the ground surface GR.

Outputs from the group of various sensors S are input into the ECU 44 through the I/O 44b. On the basis of the outputs of the group of various sensors S, the ECU 44 supplies power from the battery 32 to the travel motor 26, the work motor 22, and the height adjustment motor 100. The ECU 44 controls the traveling of the work vehicle 10 by outputting a control value via the I/O 44b and controlling the travel motor 26. In addition, the height of the blade 20 is adjusted by outputting a control value through the I/O 44b and controlling the height adjustment motor 100. Further, the rotation of the blade 20 is controlled by outputting a control value through the I/O 44b to control the work motor 22. Here, the I/O 44b can function as a communication interface and can be connected to another device in a wired or wireless manner via a network 150.

The charging station 300 functions as a charging device for charging a battery (battery 32) of the work vehicle 10. The work vehicle 10 is installed in the work area, and can return to the charging station 300 and perform charging by connecting the charging terminal 34 to the charging station 300.

<Virtual Line Setting Method>

Figure 4A:
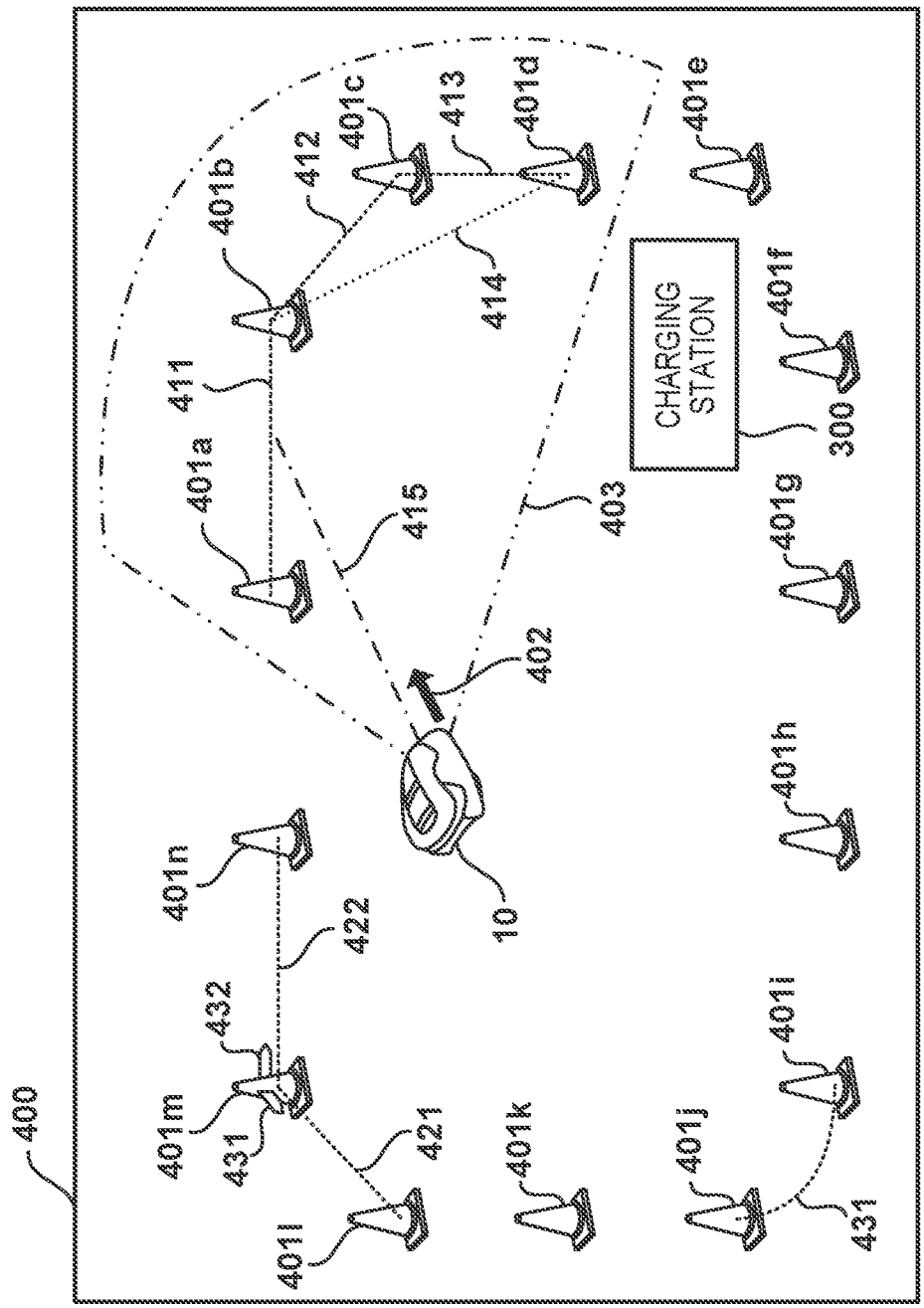
FIG. 4A is an explanatory diagram of a method for setting a virtual line and a method for determining adjacent markers according to an embodiment of the present invention.

A virtual line setting method according to the present embodiment will be described with reference to FIG. 4A. A virtual line is an imaginary line connecting markers arranged to define the work area. In FIG. 4A, reference numeral 400 denotes a region (for example, the entire site owned by a user) including the work area (for example, a garden) where the work vehicle 10 performs work. Reference numerals 401a to 401n denote markers according to the present embodiment. An area surrounded by these markers 401a to 401n is a work area. The work vehicle 10 performs work so as not to deviate from this work area by performing control so as not to deviate to a region beyond the virtual line. Note that the work area may be defined by partitioning the entire site using an existing area wire of a type that is embedded in the ground, and disposing markers in a part of the site to provide a non-entry area. That is, the present invention can also be applied to a case where a work area is defined by combining an existing area wire and a marker.

Reference numeral 402 denotes a traveling direction of the work vehicle 10, and reference numeral 403 denotes a range (for example, an angle of view range) that the work vehicle 10 can recognize by the camera unit 11. In the illustrated example, four markers 401a to 401d are included in the recognizable range. When recognizing the marker, the work vehicle 10 sets a virtual line (virtual wire) between two adjacent markers. In the illustrated example, a virtual line 411 is set between the marker 401a and the marker 401b, a virtual line 412 is set between the marker 401b and the marker 401c, and a virtual line 413 is set between the marker 401c and the marker 401d. To be noted, for example, since the marker 401b and the marker 401d are not adjacent markers, a virtual line is not set.

Here, the virtual line is not limited to a straight line. For example, a smooth curve may be set like a virtual line 431 set between the marker 401i and the marker 401j.

<Adjacent Marker Determination Method 1: Distance between Markers>

Whether two markers are adjacent markers can be determined based on the distance between the markers in the case where it is assumed that the markers are arranged at predetermined distance intervals. When the distance between the markers is within a predetermined distance range (for example, 2.5 m to 3.5 m), it may be determined that the markers are adjacent markers, and when the distance is out of the predetermined distance range, it may be determined that the markers are not adjacent markers. In FIG. 4A, since the length (for example, 4 m) of a line 414 is out of the predetermined distance range, the line is not set as a virtual line. As a result, it is possible to prevent the work from not being performed in the region of a triangle obtained by connecting the marker 401b, the marker 401c, and the marker 401d.

As described above, according to the determination method 1, among the plurality of markers, two markers whose distance between the markers is within the predetermined distance range are specified as adjacent markers. The predetermined distance range do not have to have an upper limit value or a lower limit value, for example, like 2.5 m or more, 3 m or more, 3 m or less, or 3.5 m or less.

<Adjacent Marker Determination Method 2: Use of Indicator>

To be noted, the method for determining whether two markers are adjacent markers is not limited to a method using the distance between the markers. For example, by using a marker, such as the marker 401m in FIG. 4A, including an indicator (For example, 431 and 432) for indicating a direction in which an adjacent marker is present, each indicator may be detected, and a nearby marker present in the direction indicated by the indicator 431 or 432 may be determined to be an adjacent marker. In the illustrated example, a virtual line 421 is set between the marker 401l and the marker 401m existing in the direction indicated by the indicator 431, and a virtual line 422 is set between the marker 401n and the marker 401n. In this case, each marker may be configured to include indicators indicating at least two directions similarly to 401m.

As described above, according to the determination method 2, each marker includes an indicator indicating the direction in which an adjacent marker exists, and a second marker existing in the direction indicated by the indicator of a first marker can be specified as an adjacent marker. When there are a plurality of markers in the direction indicated by the indicator of the first marker, the marker existing closest to the first marker may be specified as the adjacent marker. In addition, in combination with the determination method 1, a marker in a direction indicated by the indicator and within a predetermined distance range (for example, 2.5 m to 3.5 m) may be specified as an adjacent marker. In addition, the direction indicated by the indicator may be freely changed by the user. For example, the direction of the indicator may be adjustable using a rotation mechanism or the like.

<Adjacent Marker Determination Method 3: Detecting Marker Behind>

In the case of the determination method 1, in the case where three markers are arranged in an equilateral triangle shape at intervals of a predetermined distance (for example, 3 m), or in the case where four markers are arranged in a square shape at intervals of a predetermined distance (for example, 3 m), there is a possibility that it is not possible to enter a region inside the equilateral triangle or the square, and work cannot be performed in these regions.

Figure 4B:
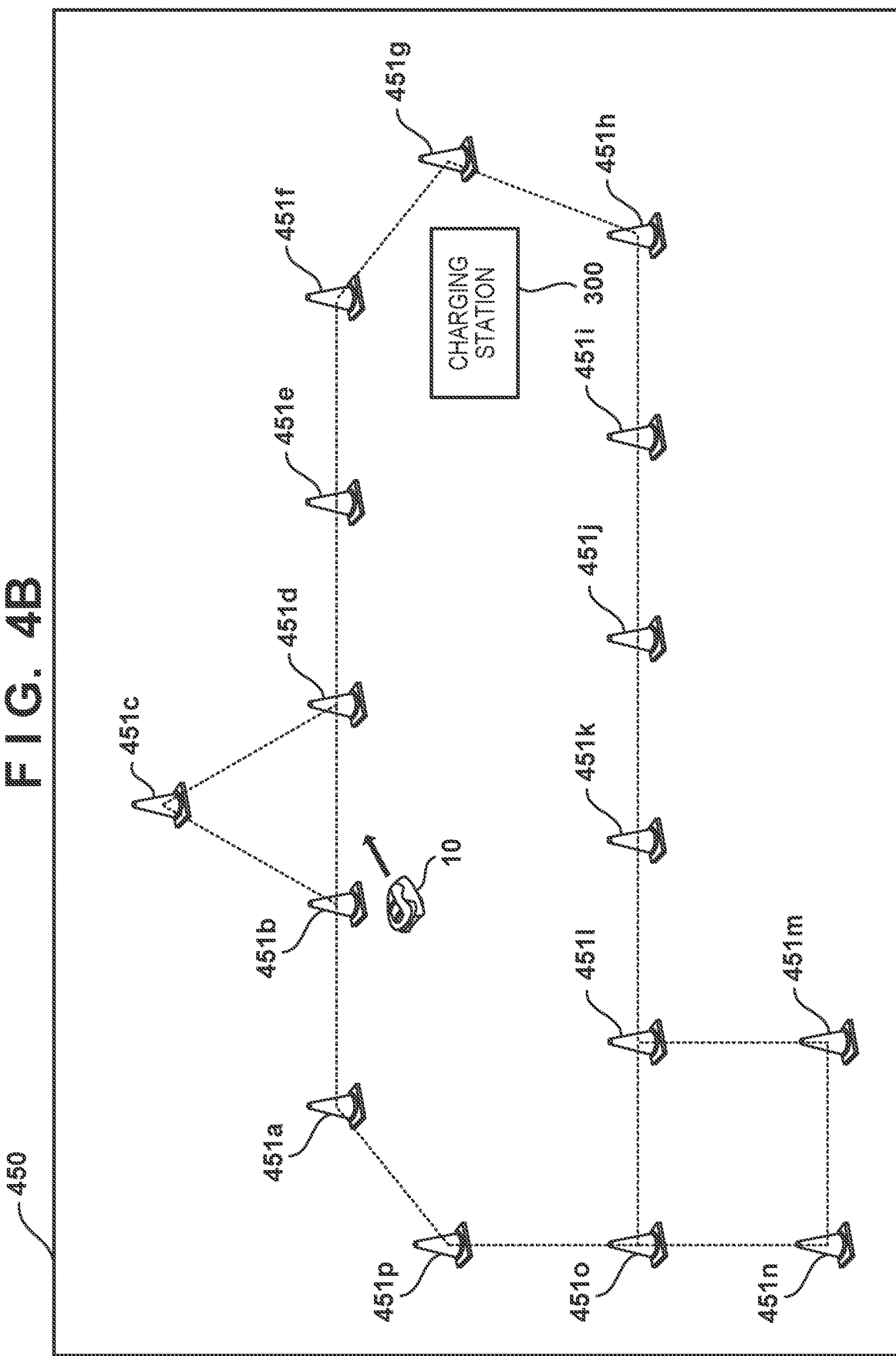
FIG. 4B is an explanatory diagram of a method for determining adjacent markers according to an embodiment of the present invention.

Here, FIG. 4B is an explanatory diagram of a method of determining an adjacent marker in a work area in which an equilateral triangular or square region is formed. Reference numeral 450 denotes a region (for example, the entire site owned by a user) including the work area (for example, a garden) where the work vehicle 10 performs work. Reference numerals 451a to 451p denote markers according to the present embodiment. An area surrounded by these markers 451a to 451p is a work area. The work vehicle 10 performs work so as not to deviate from the work area.

The markers 451a to 451p are arranged at predetermined distance (for example, 3 m) intervals. In this work area, an equilateral triangular region is formed by three markers of the marker 451b, the marker 451c, and the marker 451d. Similarly, a square region is formed by four markers of the marker 451l, the marker 451m, the marker 451n, and the marker 451o. If there are such regions, when the determination method 1 is used, the work vehicle 10 cannot move to a region behind the virtual line connecting the marker 451b and the marker 451c and the virtual line connecting the marker 451l and the marker 451o, so that the work cannot be performed in these regions.

Therefore, when another marker is detected behind the two markers, it may be determined that the two markers are not adjacent markers. In the illustrated example, two markers of the marker 451b and the marker 451d are detected, and the other marker 451c is further detected behind the two markers. Therefore, it is determined that the two markers 451b and 451d are not adjacent markers. Similarly, two markers of the marker 451l and the marker 451o are detected, and the other markers 451m and 451n are further detected behind the two markers. Therefore, it is determined that the two markers 451l and 451o are not adjacent markers.

As a result, no virtual line is set between the marker 451b and the marker 451c and between the marker 451l and the marker 451o, so that the work vehicle 10 can enter an equilateral triangular area and a square area to perform work.

As described above, according to the determination method 3, when another marker is present in a region behind a line connecting two markers, it is specified that the two markers are not adjacent markers. However, when the determination method 3 is applied, in the case where another marker at a position far away from the two markers is detected, there is a possibility of erroneous entry to the back region. Therefore, a configuration in which movement to the back region is only possible when the distance to the other marker is calculated and the calculated distance is equal to or less than a predetermined distance (for example, 4 m), or when it is determined that the other marker is a marker adjacent to either one of the two markers on the front side. As a result, it is possible to suppress entry into a region that should not be originally entered.

<Adjacent Marker Determination Method 4: Tracing Markers in Advance>

Figure 4C:
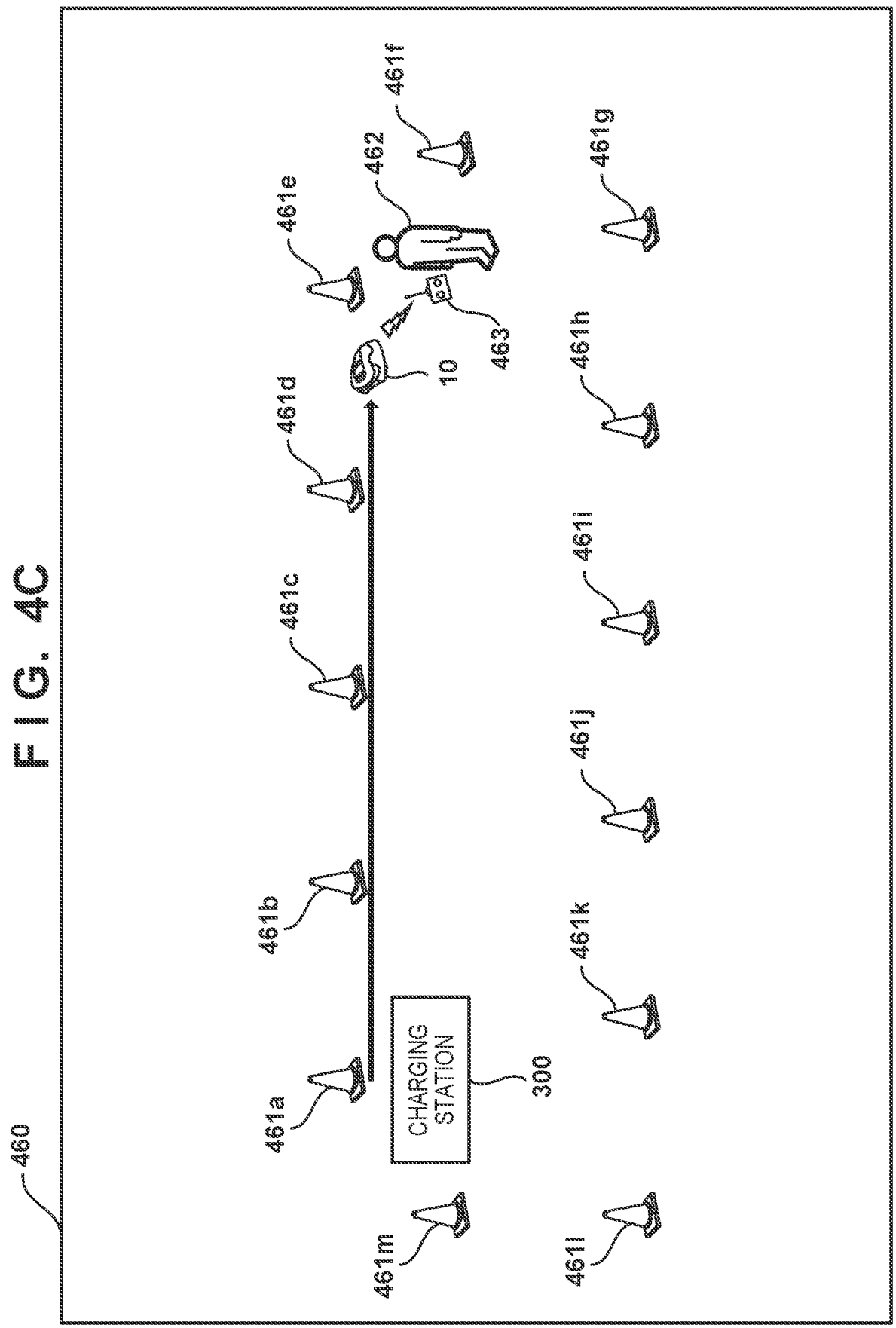
FIG. 4C is an explanatory diagram of a method for determining adjacent markers according to an embodiment of the present invention.

FIG. 4C is an explanatory diagram of an example of a method of determining adjacent markers. Reference numeral 460 denotes a region (for example, the entire site owned by a user) including the work area (for example, a garden) where the work vehicle 10 performs work. Reference numerals 461a to 461m denote markers according to the present embodiment. An area surrounded by these markers 461a to 461m is a work area. The work vehicle 10 performs work so as not to deviate from the work area.

Before starting work by the work vehicle 10, a user 462 directly controls the work vehicle 10 by operating a remote controller 463, and moves the work vehicle 10 one lap along each marker. An operation signal from the remote controller 463 is received via the communication unit 35 of the work vehicle 10.

In addition, the work vehicle 10 includes a GPS sensor 48, and stores a trajectory obtained by sequentially tracing each marker according to the operation signal of the remote controller 463 as trajectory information of the work area. As a result, since the trajectory information of the work area can be grasped before the start of the work, it is possible to determine whether or not the two markers are adjacent markers, by determining that markers not following the trajectory are not adjacent markers after the start of the work.

As described above, according to the determination method 4, the trajectory information of the work vehicle 10 is acquired by causing the work vehicle 10 to travel along each of the arranged markers. As a result, two markers matching the trajectory information among the plurality of markers can be specified as adjacent markers.

<Adjacent Marker Determination Method 5: Drawing Work Area Boundary on Map by Communication Terminal>

Figure 4D:
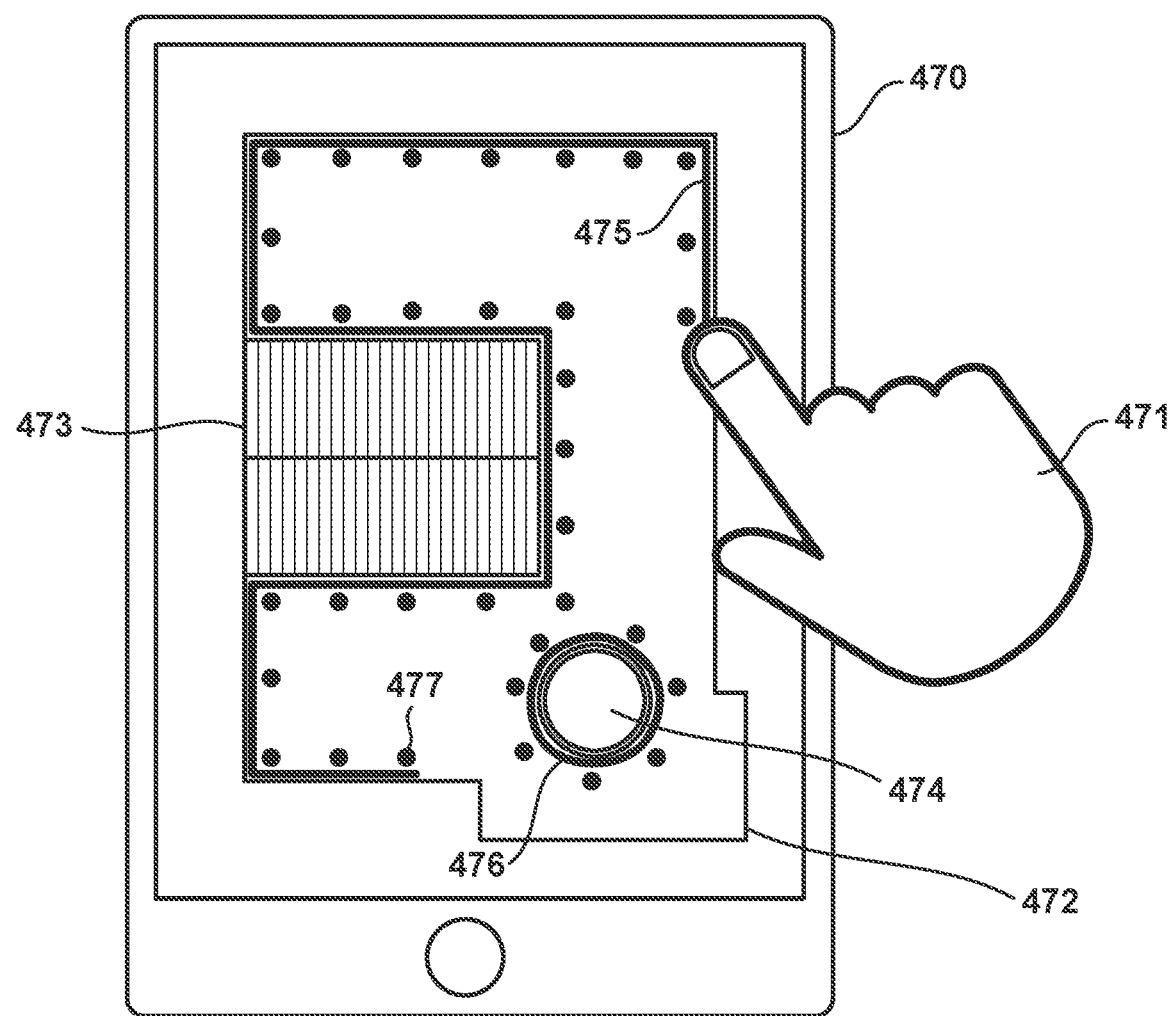
FIG. 4D is an explanatory diagram of a method for determining adjacent markers according to an embodiment of the present invention.
Figure 4E:
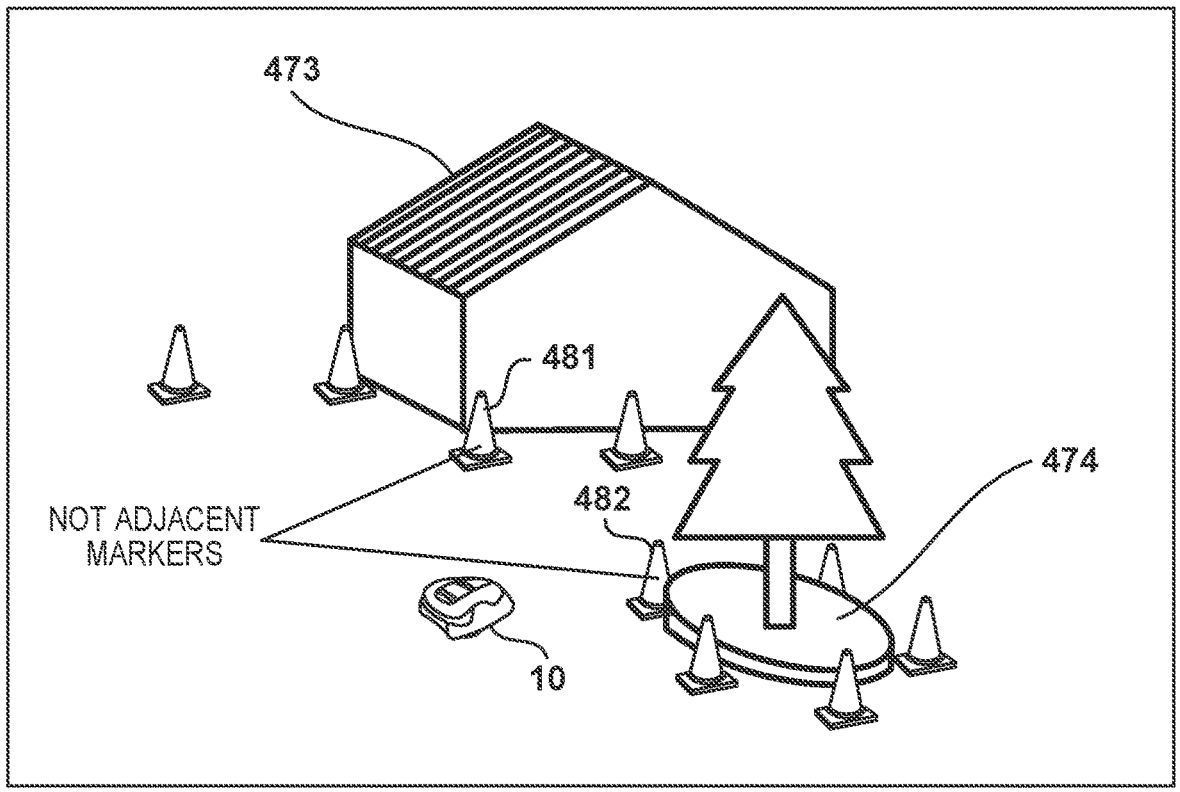
FIG. 4E is an explanatory diagram of a method for determining adjacent markers according to an embodiment of the present invention.

FIG. 4D is a diagram illustrating an example of drawing something on a map related to a work area displayed on a communication terminal held by a user. Reference numeral 470 denotes a communication terminal of the user, which is, for example, a tablet or a smartphone. Reference numeral 471 denotes a hand of the user. Reference numeral 472 represents map information on the work area displayed on a display screen of the communication terminal 470. In the illustrated example, a map of a site including a home and a garden of the user as viewed from above is displayed. Reference numeral 473 denotes a roof of the user's home, and reference numeral 474 denotes a tree space in a site of the user's home. Here, FIG. 4E is an external view of a part of the site including the user's home corresponding to the map information of FIG. 4D.

In FIG. 4D, reference numeral 475 denotes a boundary traced on the map by the user using a finger of the hand 471. Similarly, reference numeral 476 indicates a boundary traced around the tree space by the user using the finger of hand 471. A tree spaces 474 is an island excluded from the work area. Note that the boundary may be designated by connecting positions pointed by a finger instead of tracing using the finger.

In this manner, the boundary of the work area is designated on a map displayed on the communication terminal 470, and the designated boundary information (information indicating the position of a boundary line) is transmitted to the work vehicle 10. As a result, since the work vehicle 10 can acquire the boundary information designated by the user operation, the work vehicle 10 can recognize its self-position and orientation using the GPS sensor 48 and the orientation sensor 46, and determine whether or not two detected markers are adjacent markers using the self-position and orientation and the boundary information. In the example of FIG. 4E, the work vehicle 10 can determine that a marker 481 and a marker 482 are not adjacent markers from the acquired boundary information. To be noted, the self-position and orientation may be recognized by using, in addition to or instead of the GPS sensor 48 and the orientation sensor 46, an odometry and an inertial measurement unit (IMU).

To be noted, the method of tracing the boundary is not limited to the method in which the user traces the boundary using the finger of the hand 471. As indicated by black circles 477 in FIG. 4D, the user may sequentially point out a plurality of positions of markers on the map along the boundary using the finger of the hand 471 to acquire marker arrangement information as the boundary information. The boundary information may be transmitted from the communication terminal 471 to the work vehicle 10.

Even in a case where the position of each marker is pointed out, it is possible to determine whether or not two detected markers are adjacent markers by using the self-position and orientation and the boundary information (marker arrangement information). For example, in the example of FIG. 4E, the work vehicle 10 can determine that the marker 481 and the marker 482 are not adjacent markers from the boundary information (marker arrangement information).

As described above, according to the determination method 5, the boundary information (for example, arrangement information of a plurality of markers arranged at the boundary of the work area (position information designated by pointing) or information of a boundary line (line traced with a finger) indicating the boundary of the work area) of the work area designated on the map including the work area is acquired. As a result, two markers matching the boundary information among the plurality of markers can be specified as adjacent markers.

<Adjacent Marker Determination Method 6: Enclosing Island with Different Types of Markers>

Figure 4F:
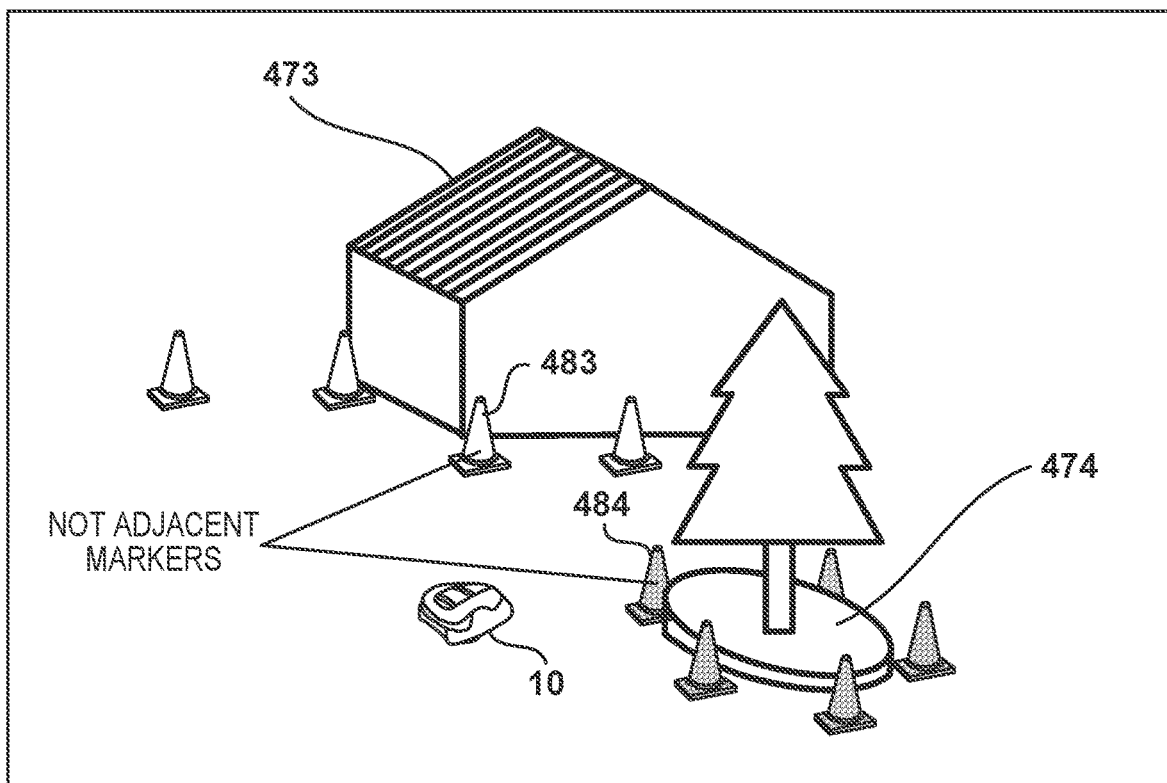
FIG. 4F is an explanatory diagram of a method for determining adjacent markers according to an embodiment of the present invention.

FIG. 4F illustrates an example of a method using two types of markers. Different types (For example, different colors, different shapes, and the like) of markers are respectively used for each marker arranged on the boundary of the work area and each marker arranged around the tree space 474 which is an island excluded from the work area. As a result, the work vehicle 10 can discriminate different types of markers from the features of the markers extracted from the captured image, and the work vehicle 10 can determine that a marker 483 and a marker 484 are not adjacent markers from the captured image.

Note that the marker is not limited to two types of markers, and in a case where there are a plurality of islands, different types of markers may be used for respective islands. Therefore, the present invention is also applicable to a case where three or more types of markers are used.

In this manner, a plurality of first type markers defining the outer edge of the work area and a plurality of second type markers defining the internal region (island) enclosed by the outer edge and excluded from the work area are used. This allows the first type markers and the second type markers to be identified as not being adjacent markers.

<Adjacent Marker Determination Method 7: Using Different Types of Markers for Respective Distances>

FIG. 4G is a diagram illustrating an example in which markers are arranged at short intervals in a region having a complicated shape. Reference numerals 491a to 491e each denote a marker for a first distance (for example, 3 m) interval. Reference numerals 492a to 492f each denote a marker for a second distance (for example, 1 m) interval. The first type markers for the first distance interval and the second type markers for the second distance interval are different types of markers having, for example, different colors, shapes, sizes, or the like.

In the illustrated example, the marker 491b, the marker 491c, and the marker 491d form an equilateral triangle shape, and the marker 491c, the marker 491d, and the marker 491e also form an equilateral triangle shape. A case where only the markers 491a to 491e are arranged in such a complicated shape will be considered. If it is determined that two markers are not adjacent markers when another marker is detected behind the two markers as in the determination method 3, for example, in the case where the work vehicle is traveling toward a position between the marker 491c and the marker 491d, the marker 491e is detected at the back, so that the work vehicle can travel in a direction approaching the marker 491e at the back beyond the boundary of the work area connecting the marker 491c and the marker 491d.

Therefore, the markers 492a to 492f are further arranged at places having complicated shapes. Accordingly, since the work vehicle 10 further detects the marker 492c and the marker 492d on the line connecting the marker 491c and the marker 491d, it is possible to determine that the two markers (the marker 491c and the marker 491d) are adjacent markers. Therefore, it is possible to prevent the work vehicle 10 from deviating to the back region beyond the boundary of the work area connecting the marker 491c and the marker 491d. To be noted, although a case where the two markers 492c and 492d are detected is has been described for the illustrated example, it may be determined that the two markers (the marker 491c and the marker 491d) are adjacent markers when either the marker 492c or the marker 492d is detected on the line connecting the marker 491c and the marker 491d.

As described above, according to the determination method 7, the plurality of first type markers arranged at the first distance intervals and the plurality of second type markers arranged at the second distance intervals shorter than the first distance intervals are used. Accordingly, when one or more second type markers are present between two first type markers among a plurality of first type markers, the two first type markers can be identified as adjacent markers.

<Processing>

Figure 5A:
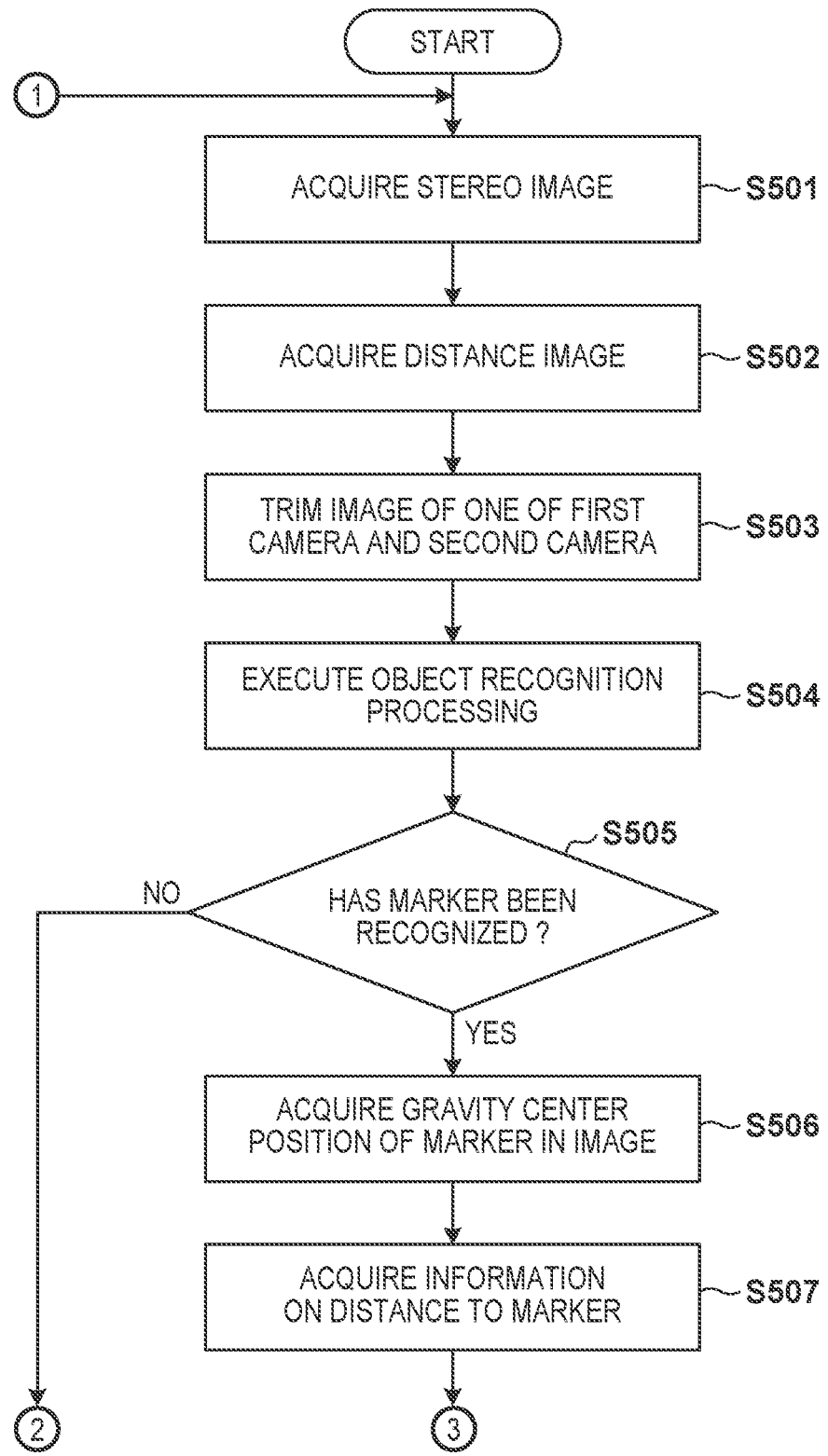
FIG. 5A is a flowchart illustrating a procedure of processing performed by an autonomous work machine according to a first embodiment.
Figure 5B:
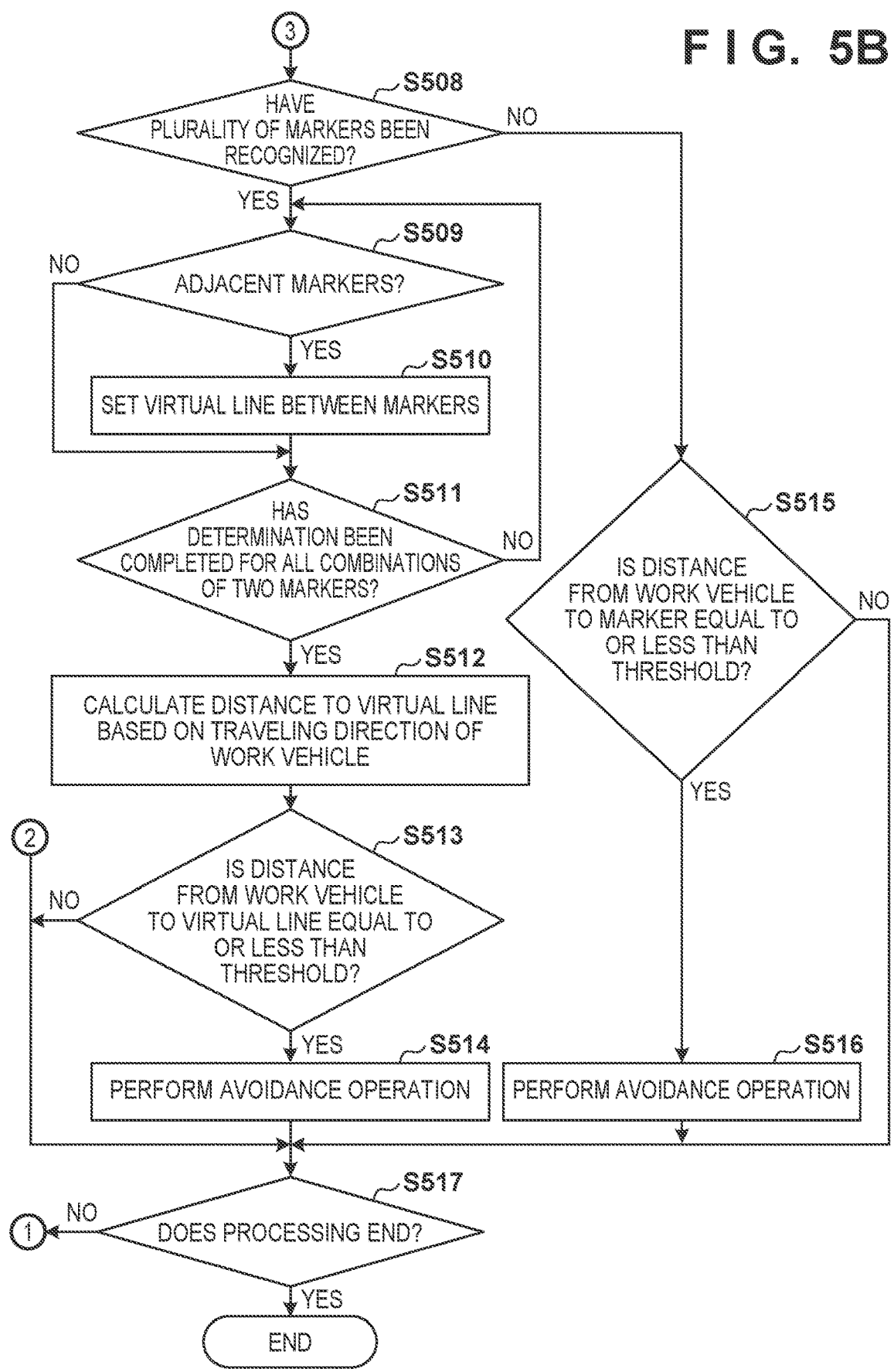
FIG. 5B is a flowchart illustrating a procedure of processing performed by the autonomous work machine according to the first embodiment.

Next, a procedure of processing performed by the work vehicle 10 according to the present embodiment will be described with reference to flowcharts of FIGS. 5A and 5B. The work vehicle 10 according to the present embodiment sets a virtual line between markers and performs control so that the work vehicle 10 does not deviate to a region beyond the virtual line.

In step S501, the CPU 44a acquires a stereo image captured by the camera unit 11.

In step S502, the CPU 44a acquires a distance image based on the stereo image.

In step S503, the CPU 44a trims an image of one of the first camera 11a and the second camera 11b constituting the camera unit 11. In the present embodiment, an image of the second camera 11b is used.

In step S504, the CPU 44a executes object recognition processing using the trimmed image. Features of objects including persons and markers are learned in advance by machine learning, and an object is recognized by comparison with the learning result.

In step S505, the CPU 44a determines whether or not a marker has been recognized as a result of the object recognition processing in step S504. In the case where it is determined that a marker has been recognized, the process proceeds to step S506. In the case where it is determined that a marker has not been recognized, the process proceeds to step S517.

In step S506, the CPU 44a acquires the gravity center position of the marker in the image. For example, a specific position of the marker is specified as the gravity center position based on information of the gravity center position of the marker held in advance. Note that the gravity center position is merely an example, and is not limited to the gravity center position. The position may be a top position of the marker, or may be a ground contact position where the marker and the ground are in contact with each other.

In step S507, the CPU 44a acquires information of the distance from the work vehicle 10 to the gravity center position of the marker as marker information using the distance image acquired in step S502.

In step S508, the CPU 44a determines whether or not a plurality of markers have been recognized in step S505. In the case where it is determined that a plurality of markers have been recognized, the process proceeds to step S509. In the case where only a single marker has been recognized, the process proceeds to step S515.

In step S509, the CPU 44a determines whether or not two markers included in the plurality of markers are adjacent markers. In the present embodiment, whether or not the distance between the two markers is within a predetermined distance range is determined, and when the distance is within the predetermined distance range, it is determined that the markers are adjacent markers. In the present embodiment, it is assumed that the markers are installed at intervals of 3 m, but the markers are not necessarily arranged at equal intervals of 3 m, and there is a possibility that some deviation occurs. Therefore, it is determined that the markers are adjacent markers if the markers are within the predetermined distance range, for example, in a range of 2.5 m to 3.5 m. In the case where it is determined that the markers are adjacent markers, the process proceeds to step S510. In contrast, in the case where it is determined that the markers are not adjacent markers, the process proceeds to step S511. As a method of determining whether or not the markers are adjacent markers, other determination methods described with reference to FIGS. 4A to 4G may be used.

In step S510, the CPU 44a sets a virtual line between the two markers determined to be adjacent markers.

In step S511, the CPU 44a determines whether or not the determination has been completed for all combinations of two markers among the plurality of markers. When the determination is completed for all the combinations, the process proceeds to step S512. In contrast, in the case where there remains a combination for which the determination has not been performed yet, the process returns to step S509, and the determination is performed on a new combination of two markers.

In step S512, the CPU 44a calculates the distance from the work vehicle 10 to a virtual line located ahead of the work vehicle 10 in the traveling direction based on the traveling direction of the work vehicle 10 and the virtual line located ahead in the traveling direction. In the example of FIG. 4A, the distance to an intersection with the virtual line 411 located ahead in the traveling direction 402 is calculated.

Figure 6:
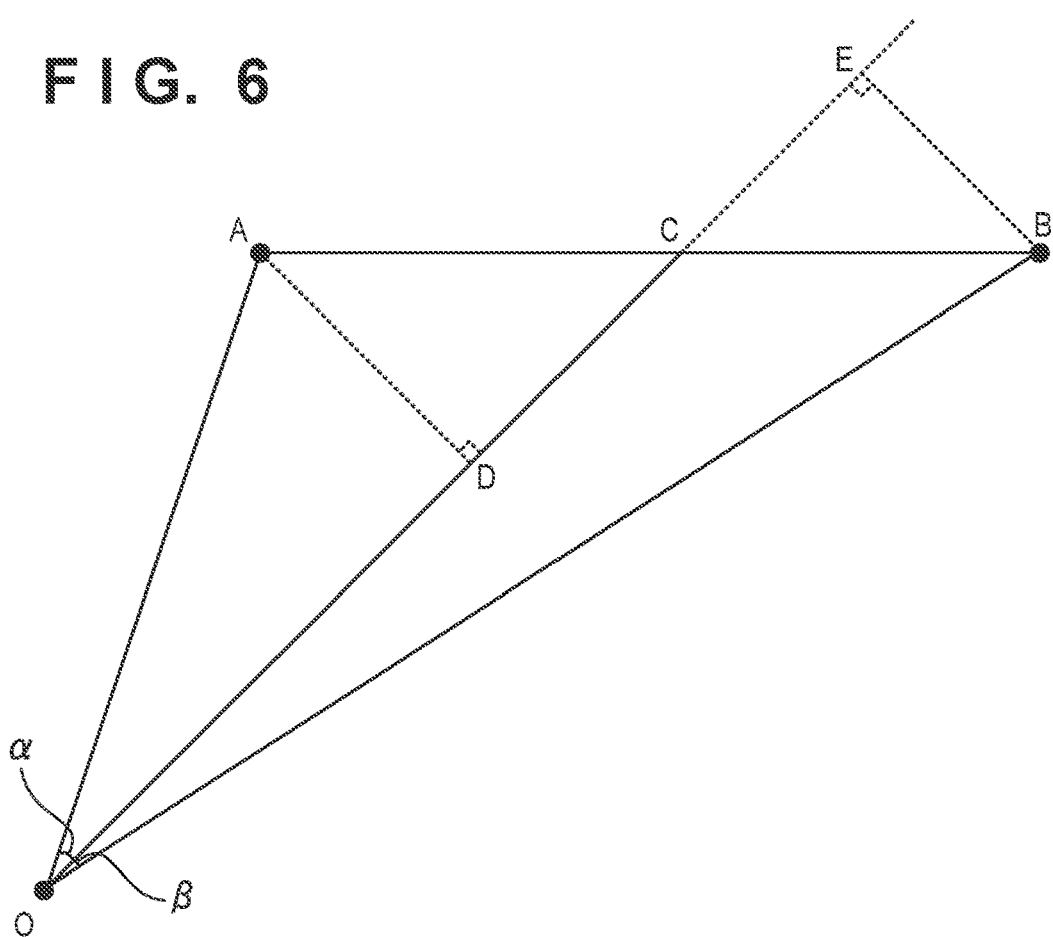
FIG. 6 is an explanatory diagram of how to obtain a distance to a virtual line according to an embodiment of the present invention.
Figure 7:
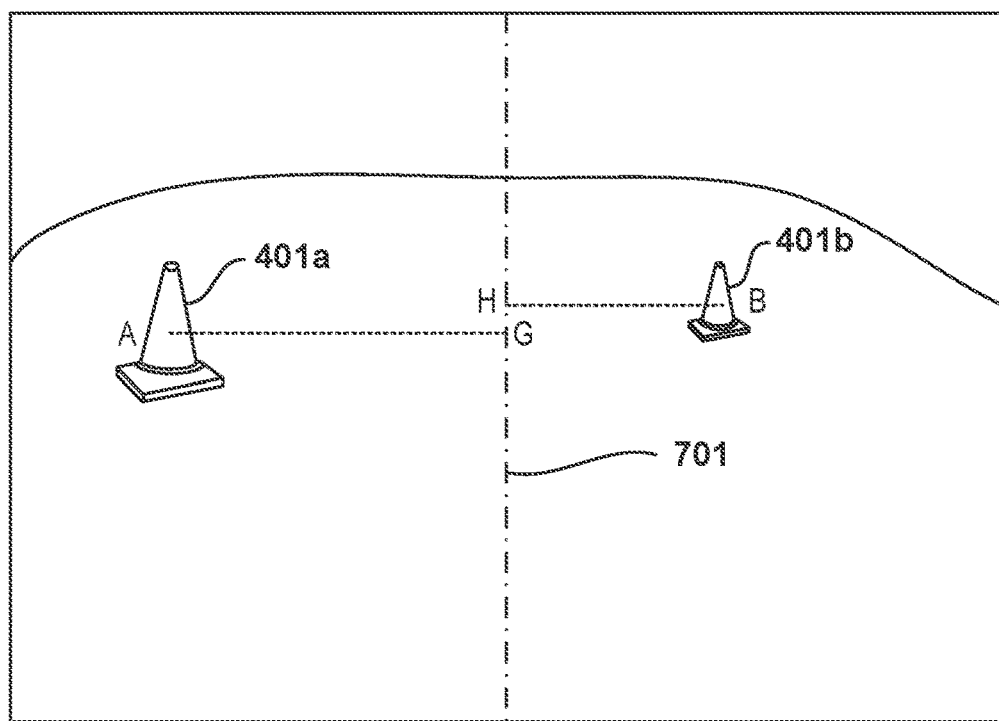
FIG. 7 is a diagram illustrating an example of a captured image according to an embodiment of the present invention.

Here, an example of a method of calculating the distance to the intersection with the virtual line 411 located ahead in the traveling direction 402 will be described with reference to FIG. 6. In FIG. 6, a point O is a current position of the work vehicle 10. A point A corresponds to the marker 401a in FIG. 4A, and a point B corresponds to the marker 401b in FIG. 4A. When the distance to be obtained is X, X is the length of a line OC. Here, the length of a line OA and the length of a line OB can be obtained from the distance image. Furthermore, an angle $\alpha$ and an angle $\beta$ can also be obtained from the imaging direction (normally, the same direction as the traveling direction 402) and the viewing angle of the camera unit 11, and the directions of the point A and the point B. Then, a perpendicular line is drawn down from the point A to the line OC, and an intersection thereof is defined as D. Similarly, a perpendicular line is drawn down from the point B to an extension line of the line OC, and an intersection thereof is defined as E. At this time, since a triangle ACD and a triangle BCE are similar, AD:BE=CD:CE holds. Then, as illustrated in FIG. 7 illustrating an example of the captured image, the ratio between AD and BE can be obtained from the ratio of the distance from a center line 701 of the image of one camera captured by the camera unit 11 (that is, the ratio of the length between AG and BH).

In FIG. 6, AD=OA sin $\alpha$, BE=OB sin $\beta$, CD=OC−OA cos $\alpha$, and CE=OB cos $\beta$−OC hold, and therefore a distance X to the point C can be obtained by $$AD:BE =$$
$$CD:CE \leftrightarrow OA\sin\alpha:OB\sin\beta = OC - OA\cos\alpha:OB\cos\beta - OC \leftrightarrow OC =$$
$$OAOB \times (\sin\alpha\cos\beta + \cos\alpha\sin\beta)/(OB\sin\beta + OA\sin\alpha) =$$
$$OAOB\sin(\alpha + \beta)/(OB\sin\beta + OA\sin\alpha) = X$$

In step S513, the CPU 44a determines whether or not the distance from the work vehicle 10 to the virtual line located ahead of the work vehicle 10 in the traveling direction is equal to or less than a threshold value (for example, 0.1 m). When it is determined that the distance is equal to or less than the threshold, the process proceeds to S514. In contrast, in the case where the distance is larger than the threshold value, the process proceeds to step S517.

In step S514, the CPU 44a executes an avoidance operation based on the virtual line. Specifically, when the work vehicle 10 approaches a threshold (for example, 0.1 m) from the virtual line, the work vehicle 10 stops, moves backward, or turns. Accordingly, it is possible to prevent the work vehicle 10 from deviating to a region beyond the virtual line. For example, the work vehicle 10 stops, moves backward, or turns the work vehicle 10 when the distance from the work vehicle 10 to the virtual line 415 becomes equal to or less than the threshold so as not to deviate to the back region beyond the intersection position of the line 415 extending in the traveling direction 415 and the virtual line 411 existing in the traveling direction 415 illustrated in FIG. 4A. As a result, the work vehicle 10 can perform work without deviating from the work area. Here, the turning is to change the traveling direction of the work vehicle 10, and includes moving along a parabolic trajectory when the site is viewed from above, rotating on the spot after stopping at a certain point to change the traveling direction, and going around so as not to enter the region defined by the virtual line.

When the distance to the virtual line becomes equal to or less than another threshold value (for example, 1.5 m), control for lowering the traveling speed of the work vehicle 10 heading for the virtual line 415 may be further performed. By decelerating in advance before performing an avoidance operation such as stop, backward movement, or turning, it is possible to suppress sudden operation such as sudden stop, sudden backward movement after sudden stop, or sudden turning.

In step S515, the CPU 44*a* determines whether or not the distance from the work vehicle 10 to the marker is equal to or less than a threshold. The threshold here is, for example, 0.5 m, but is not limited to this value. When it is determined that the distance is equal to or less than the threshold, the process proceeds to S516. In contrast, in the case where the distance is larger than the threshold value, the process proceeds to step S517.

In step S516, the CPU 44*a* executes the avoidance operation. Specifically, when the work vehicle 10 stops, moves backward, or turns when reaching a threshold distance (for example, 0.5 m) from a marker. Since only one marker is detected, the avoidance operation is performed independently of the virtual line. Thereafter, the process proceeds to step S517.

In step S517, the CPU 44*a* determines whether to end the series of processing. For example, there are a case where the remaining battery charge becomes equal to or lower than a threshold and it is necessary to return to the charging station 300, a case where a predetermined time has elapsed from the start of work, and a case where work in the work area has been completed (for example, the lawn in the work area has been mowed). This also applies to a case where the user operates the power source of the work vehicle 10 to be turned off. In the case where it is determined not to end the series of processing, the process returns to step S501. In contrast, in the case where it is determined to end the series of processing, the processing of FIGS. 5A and 5B is ended.

As described above, in the present embodiment, two markers are detected, and a virtual line is set between the markers. Then, the avoidance operation is executed so that the work vehicle does not deviate to the back region beyond the virtual line. As a result, it is possible to control the work machine using the same type of marker, and it is not necessary to prepare a plurality of markers having different features so that each of the markers can be distinguished. Therefore, it is also possible to reduce the introduction cost of the marker. In addition, in order to set the virtual line (virtual wire), it is not necessary to provide an area wire (for example, a wire embedded in the ground) for defining the work area, so that the cost can be reduced. To be noted, as described above, an existing area wire and a marker may be combined to define the work area, and in this case, the area wire does not have to be provided for some regions, so that the cost can be reduced. Further, since the markers can be freely arranged, the shape of the work area can be flexibly changed. For example, in the case where the user himself/herself works in a part of a garden, there is a case where the work vehicle is not desired to enter the area. In this case, by defining the region so as to be surrounded by markers, it is possible to easily create an area where the work vehicle does not temporarily enter.

Modifications

To be noted, when it is necessary to return to the charging station 300 or when it is necessary to move to a predetermined position, the CPU 44*a* sets a travel route for the work vehicle 10 to travel according to the set travel route. At that time, the travel route is set such that the virtual line does not exist on the travel route. Accordingly, it is possible to prevent traveling beyond the virtual line and deviating.

In addition, although an example in which the processing is performed in consideration of combinations of two markers for all the detected markers has been described in step S511, markers on the left and right of the line along the traveling direction may be set as processing targets based on the traveling direction of the work vehicle 10. For example, in the example of FIG. 4A, it is possible to set only markers on the left and right of the line 415 along the traveling direction 415 instead of processing all the combinations (6 combinations) of the four markers 401*a* to 401*d*. In this case, three combinations of the marker 401*a* and the marker 401*b*, the marker 401*a* and the marker 401*c*, and the marker 401*a* and the marker 401*d* may be set as processing targets, and three combinations of the marker 401*b* and the marker 401*c*, the marker 401*b* and the marker 401*d*, and the marker 401*c* and the marker 401*d* may be excluded from the processing targets. This makes it possible to speed up the processing.

In addition, in the present embodiment, an example has been described in which, when the distance from the work vehicle 10 to the virtual line is larger than the threshold in step S513, the process returns to step S501 through step S517, and the stereo image is acquired again. However, in the case re-capturing images all the time, as the work vehicle 10 travels and approaches the virtual line, a plurality of markers may come to not be detected. Therefore, instead of necessarily returning to step S501 and re-capturing images, control may be performed such that the timing at which the distance from the work vehicle 10 to the virtual line becomes equal to or less than the threshold is estimated on the basis of the traveling speed of the work vehicle 10, and the avoidance operation is executed when that timing arrives. Alternatively, a distance from a certain point to the virtual line is calculated, and thereafter, a moving distance from the point is constantly measured by odometry, an inertial measurement unit (IMU), or the like. Then, the operation of the work vehicle 10 may be controlled based on the calculated distance and the moving distance being measured. For example, the avoidance operation may be executed in response to the moving distance being measured reaching the "distance from the point to the virtual line".

In addition, in steps S512 and S513, an example in which the avoidance operation is controlled on the basis of the distance between the work vehicle 10 and the virtual line has been described, but it is not limited to the distance. For example, a time required for the work vehicle 10 to reach the virtual line 411 may be calculated, and whether or not the work vehicle 10 has reached the virtual line may be determined on the basis of the calculated time. For example, the time may be calculated based on the traveling speed of the work vehicle 10 and the distance from the work vehicle 10 to the virtual line 411. Then, the avoidance operation may be controlled to be executed when the difference between the time and the elapsed time is equal to or less than a threshold. Similarly, in step S515, an example in which the avoidance operation is controlled on the basis of the distance between the work vehicle 10 and a marker has been described, but it is not limited to the distance. For example, a time required for the work vehicle 10 to reach the marker may be calculated, and whether or not the work vehicle 10 has reached the marker may be determined on the basis of the calculated time.

In addition, control may be performed in parallel with repeating the processing by returning to step S501, such that the avoidance operation is separately executed when the timing at which the distance from the work vehicle 10 to the virtual line becomes equal to or less than the threshold arrives.

Second Embodiment

In the first embodiment, an example has been described in which information of the distance to a detected marker is acquired as marker information, and the avoidance operation is performed by calculating the distance from the work vehicle to the virtual line and the time until the work vehicle reaches the virtual line are calculated using the distance information. In contrast, in a second embodiment, an example will be described in which marker position information indicating position coordinates of a marker is acquired as marker information, and the avoidance operation is performed by calculating a distance from the work vehicle to the virtual line and a time until the work vehicle reaches the virtual line by using the marker position information and self-position information and orientation information of the work vehicle.

Since the system configuration and the configuration of the autonomous work machine are similar to those described in the first embodiment, the description thereof will be omitted.

<Processing>

Figure 8A:
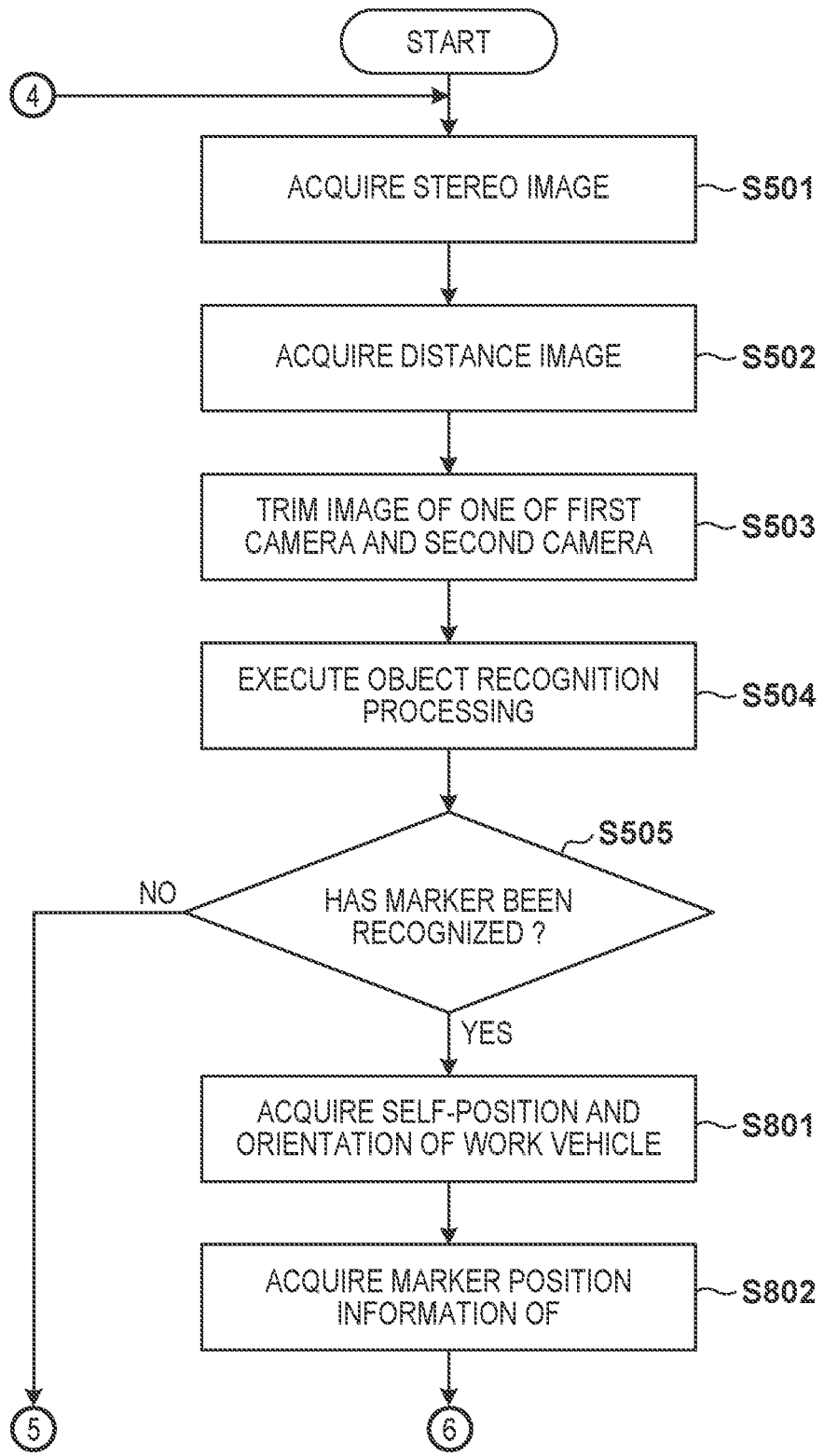
FIG. 8A is a flowchart illustrating a procedure of processing performed by an autonomous work machine according to a second embodiment.
Figure 8B:
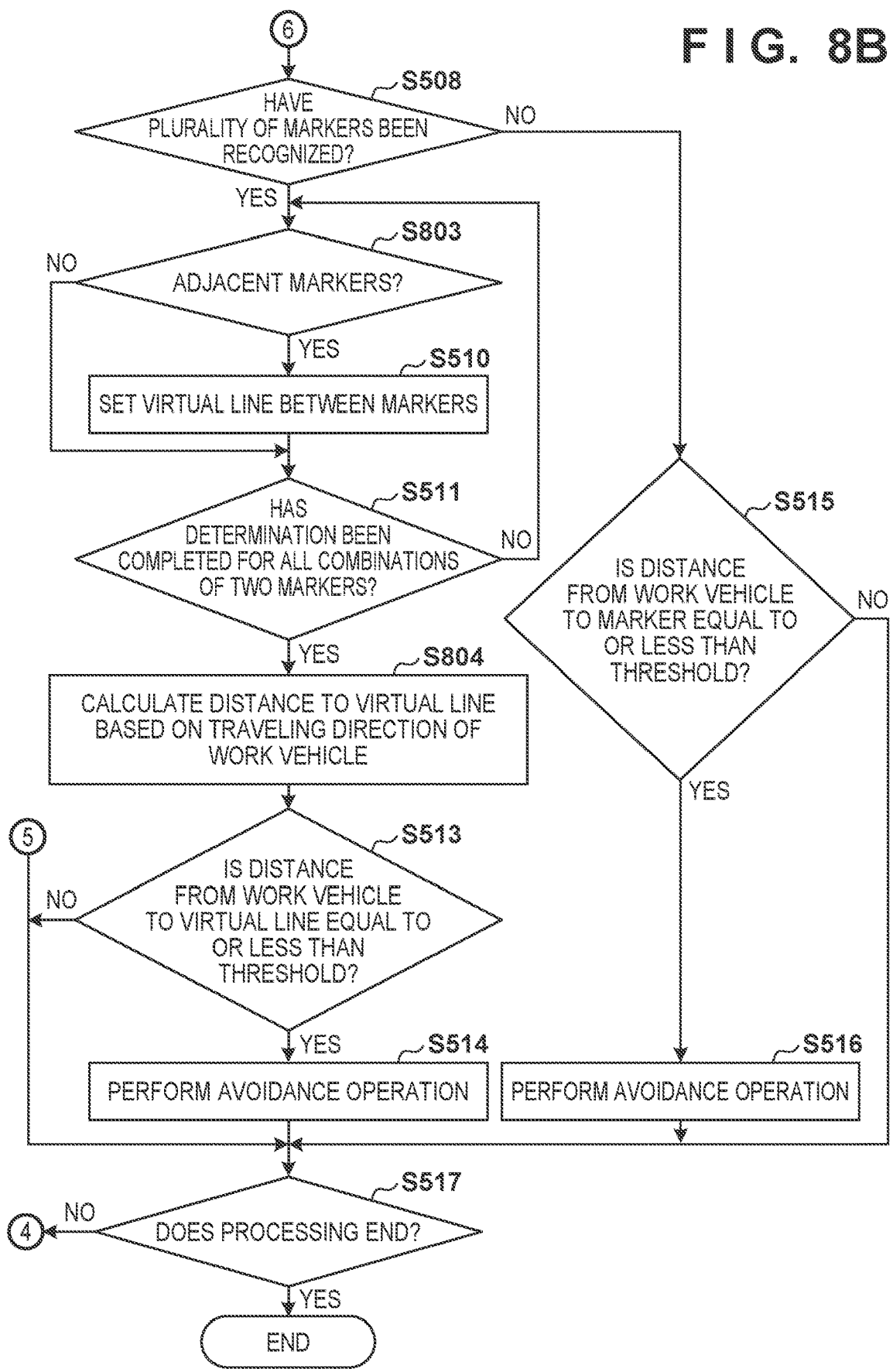
FIG. 8B is a flowchart illustrating a procedure of processing performed by the autonomous work machine according to the second embodiment.

Next, a procedure of processing performed by the work vehicle 10 according to the present embodiment will be described with reference to flowcharts of FIGS. 8A and 8B. The work vehicle 10 according to the present embodiment sets a virtual line between markers and performs control so that the work vehicle 10 does not deviate to a region beyond the virtual line. Steps of performing the same processes as those in the flowcharts of FIGS. 5A and 5B are denoted by the same reference numerals. Hereinafter, differences from FIGS. 5A and 5B will be mainly described.

In step S801, the CPU 44a acquires information on the self-position and orientation using the GPS sensor 48 and the orientation sensor 46.

In step S802, the CPU 44a acquires marker position information (position coordinates) of the detected marker as marker information. For example, as described with reference to FIG. 4D in the first embodiment, the marker position information is stored in advance in the memory 44c as map information so that the marker position information can be referred to. The work vehicle 10 recognizes its self-position and orientation using the GPS sensor 48 and the orientation sensor 46, specifies which marker included in the map information is the marker detected from the image captured by the camera unit 11, and acquires marker position information of the detected marker.

Alternatively, the marker position information can be specified from the landscape information of the image captured by the camera unit 11. For example, landscape information and a marker included in an image are stored in advance in association with information of the distance to the marker obtained by measurement distance in the landscape. Then, while the work vehicle 10 is caused to travel in the work area, the association is performed at various places and stored as learning information. Then, by referring to this learning information, position coordinates of the marker detected from the image captured by the camera unit 11 can be acquired as marker position information using the self-position and orientation recognized using the GPS sensor 48 and the orientation sensor 46.

Alternatively, the work vehicle 10 recognizes its self-position and orientation using the GPS sensor 48 and the orientation sensor 46, and acquires, on the basis of an image having parallax (S501 and S502), information on the distance (distance image) to a marker detected from an image captured by the camera unit 11. Furthermore, an angle (for example, the angle α or the angle β in FIG. 6) at which the marker exists with respect to the photographing direction of the camera unit 11 is obtained from the position of the marker with respect to the image center of the captured image. Then, a direction in which the marker is present may be specified from the orientation of the work vehicle 10 and the acquired angle, and position coordinates that is ahead along the direction by a distance indicated by the acquired distance information may be acquired as the marker position information.

In step S803, the CPU 44a determines whether or not two markers included in the plurality of markers are adjacent markers. Also in the present embodiment, the determination method is the same as that in the first embodiment, and thus detailed description thereof is omitted.

In step S804, the CPU 44a calculates the distance from the work vehicle 10 to a virtual line located ahead of the work vehicle 10 in the traveling direction based on the traveling direction of the work vehicle 10 and the virtual line located ahead in the traveling direction. In the example of FIG. 4A, the distance to an intersection with the virtual line 411 located ahead in the traveling direction 402 is calculated.

Here, an example of a method of calculating the distance to the intersection with the virtual line 411 located ahead in the traveling direction 402 of FIG. 4A will be described again with reference to FIG. 6. In FIG. 6, a point O is a current position of the work vehicle 10. A point A corresponds to the marker 401a in FIG. 4A, and a point B corresponds to the marker 401b in FIG. 4A. When the distance to be obtained is X, X is the length of a line OC. Here, since the position coordinates of the point A, the position coordinates of the point B, and the position coordinates (self-position) of the point O are known, the length of the line OA and the length of the line OB can be obtained from these. Thereafter, the distance from the work vehicle 10 to the virtual line 411 located ahead in the traveling direction of the work vehicle 10 is calculated by a procedure similar to the procedure described in the first embodiment.

Other steps are similar to the processing described with reference to FIGS. 5A and 5B.

As described above, in the second embodiment, marker position information indicating position coordinates of a marker is acquired as marker information, and the avoidance operation is performed by calculating a distance from the work vehicle to the virtual line and a time until the work vehicle reaches the virtual line by using the marker position information and self-position information and orientation information of the work vehicle.

As a result, the operation of the work vehicle can be controlled using the marker position information indicating the position coordinates of the marker and the self-position and orientation of the work vehicle.

Third Embodiment

In a third embodiment, an example will be described in which map information including position information of markers arranged to define a work area is generated and presented to a user.

Since the system configuration and the configuration of the autonomous work machine are similar to those described in the first embodiment, the description thereof will be omitted.

The work vehicle 10 acquires information on the distance to the detected marker from an image captured by the camera unit 11, while acquiring information on its self-position and orientation using the GPS sensor 48 and the orientation sensor 46. As described in the first embodiment, the distance to the marker can be acquired on the basis of an image having parallax. Furthermore, an angle (for example, the angle α or the angle β in FIG. 6) at which the marker exists with respect to the photographing direction of the camera unit 11 is obtained from the position of the marker with respect to the image center of the captured image as illustrated in FIG. 7. Then, a direction in which the marker is present may be specified from the orientation of the work vehicle 10 and the acquired angle, and position coordinates that is ahead along the direction by a distance indicated by the acquired distance information is acquired as the marker position information. Each time the work vehicle 10 detects a marker while performing work, the work vehicle calculates position information (position coordinates) of the marker by using information on the self-position and orientation, information on the distance to the marker, and a direction in which the marker exists. Then, the calculated position information of the marker is plotted on the map. As a result, map information including position information of markers arranged to define a work area can be generated.

Figure 9:
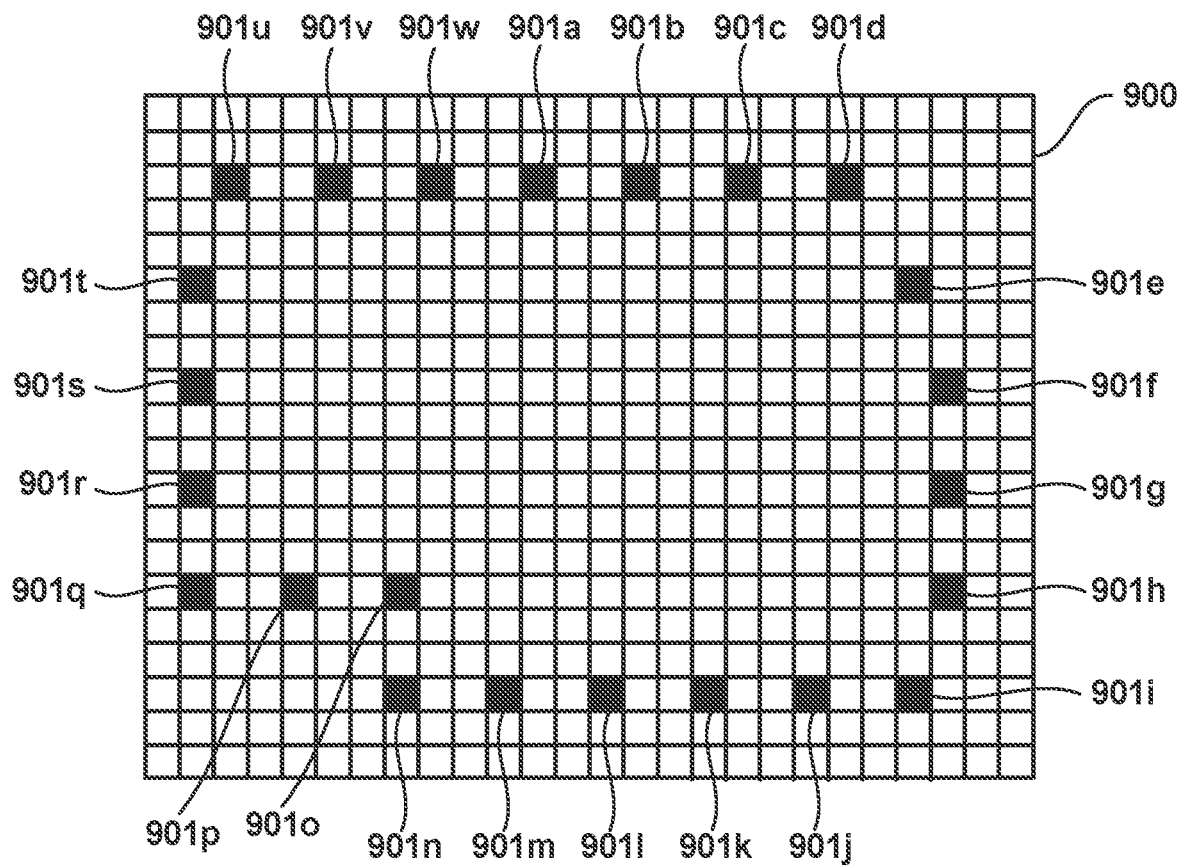
FIG. 9 is a diagram illustrating an example of map information obtained by plotting marker positions according to a third embodiment.

FIG. 9 is an example of a map on which position information of markers is plotted. Reference numeral 901 denoted a map, and the map is defined as a grid area divided in a grid pattern. Reference numerals 901a to 901w are each position information of a plotted marker. The work vehicle 10 generates such map information and stores the map information as a map database while performing work or traveling before starting work. In addition, the generated map information may be presented to the user. As a method of presentation to the user, when a display unit is provided in the work vehicle 10, the presentation may be performed by displaying on the display unit. Alternatively, the work vehicle 10 may transmit map information to a communication terminal (for example, a tablet, a smartphone, or the like) possessed by the user and present the map information on a display screen of the communication terminal.

As described above, in the present embodiment, an example map information including marker positions arranged to define a work area is generated and presented to the user. As a result, the user can acquire the map information on manually arranged markers. Therefore, it is also possible to manually adjust the arrangement positions of the markers later to redefine a more appropriate work area.

Note that the processing of the present embodiment may be performed in parallel with the first embodiment and the second embodiment, or may be performed independently of these. In the case of performing the processing in parallel, at least one of the information of the virtual line acquired by the processing of the first embodiment or the second embodiment and the position information of the marker acquired by the processing of the third embodiment may be reflected in the map information and presented to the user.

In the embodiments described above, the lawn mower has been described as an example of the autonomous work machine, but the autonomous work machine is not limited to the lawn mower. For example, the present invention can also be applied to other types of autonomous work machines such as an autonomous snow removing machines, golf ball collectors, outboard motors, and the like.

Summary of Embodiments

1. The autonomous work machine (for example, 10) of the embodiments described above is
an autonomous work machine that works in a work area, and includes
a detection means (for example, 11 and 44a) that detects a plurality of markers (for example, 401a to 401n) arranged to define the work area,
a specifying means (for example, 44a) that specifies marker information based on a detection result of the detection means,
a setting means (for example, 44a) that sets a virtual line (for example, 411, 412, and 413) connecting the plurality of markers based on the marker information specified by the specifying means, and
a control means (for example, 44a) that controls the autonomous work machine such that the autonomous work machine does not deviate to a region beyond the virtual line set by the setting means.

According to this embodiment, it is possible to control a work machine using markers that do not need to be individually distinguished. For example, the work machine can be controlled using the same type of marker.

2. In the autonomous work machine (for example, 10) of the embodiments described above,
the control means calculates a time required for the autonomous work machine to reach the virtual line, and controls the autonomous work machine based on the calculated time.

According to this embodiment, the avoidance operation can be performed before the time required to reach the virtual line is reached. In addition, deviation can be prevented without using an IMU or a GPS sensor for recognizing the self-position.

3. In the autonomous work machine (for example, 10) of the embodiments described above,
the control means calculates the time based on a speed of the autonomous work machine and a distance from the autonomous work machine to the virtual line.

According to this embodiment, the avoidance operation can be performed before the time required to reach the virtual line is reached. In addition, deviation can be prevented without using an IMU or a GPS sensor for recognizing the self-position.

4. In the autonomous work machine (for example, 10) of the embodiments described above,
a measuring means (for example, IMU or odometry) that measures a moving distance of the autonomous work machine is further provided, and
the control means
calculates a distance from the autonomous work machine to the virtual line based on the marker information, and
controls the autonomous work machine based on the calculated distance and the moving distance from a position of the autonomous work machine where the distance has been calculated.

According to this embodiment, even when a marker is no longer detected on during the operation, the autonomous work machine can be controlled.

5. In the autonomous work machine (for example, 10) of the embodiments described above, the marker information includes distance information indicating a distance from the autonomous work machine to a marker, and the setting means sets the virtual line based on the distance information.

According to this embodiment, since a virtual line is set using distance information indicating the distance to a marker, the virtual line can be set even if the position information of the marker is not known.

6. In the autonomous work machine (for example, 10) of the embodiments described above, the marker information includes marker position information indicating a position coordinate of a marker, and the setting means sets the virtual line based on the marker position information.

According to this embodiment, since a virtual line is set using marker position information, the virtual line can be set without additionally acquiring information on the distance to a marker.

7. In the autonomous work machine (for example, 10) of the embodiments described above, a storage means (for example, 44c) that stores feature information of a marker is further provided, and the specifying means specifies the marker information based on the feature information of a marker stored in the storage means and a feature of a marker detected by the detection means.

According to this embodiment, it is possible to recognize a marker and acquire marker information for the marker.

8. In the autonomous work machine (for example, 10) of the embodiments described above, the control means stops, moves backward, or turns the autonomous work machine in a case where a distance from the autonomous work machine to the virtual line becomes equal to or less than a first threshold.

According to this embodiment, it is possible to prevent the autonomous work machine from deviating to the region beyond the virtual line.

9. In the autonomous work machine (for example, 10) of the embodiments described above, the control means decelerates the autonomous work machine heading for the virtual line in a case where the distance from the autonomous work machine to the virtual line becomes equal to or less than a second threshold larger than the first threshold.

According to this embodiment, by decelerating in advance before performing an operation of stop, backward movement, or turning, it is possible to suppress sudden operation such as sudden stop, sudden backward movement after sudden stop, or sudden turning.

10. In the autonomous work machine (for example, 10) of the embodiments described above, an adjacent marker specifying means (for example, 44a) that specifies two markers as adjacent markers among the plurality of markers detected by the detection means is further provided, and the control means sets a virtual line between the two markers specified as the adjacent markers by the adjacent marker specifying means.

According to this embodiment, since a virtual line is not set between markers that are not originally adjacent to each other, it is possible to prevent the occurrence of a region where no work is performed.

11. In the autonomous work machine (for example, 10) of the embodiments described above, the adjacent marker specifying means specifies, as the adjacent markers, two markers having a distance therebetween within a predetermined distance range among the plurality of markers.

According to this embodiment, it is possible to prevent markers having a long distance from each other from being determined as adjacent markers.

12. In the autonomous work machine (for example, 10) of the embodiments described above, in a case where another marker (for example, 451c) detected by the detection means is present in a region beyond a line connecting the two markers (for example, 451b and 451d), the adjacent marker specifying means specifies that the two markers are not the adjacent markers.

According to this embodiment, since a virtual line is not set between markers that are not originally adjacent to each other, it is possible to prevent the occurrence of a region where no work is performed.

13. In the autonomous work machine (for example, 10) of the embodiments described above, each marker includes an indicator (for example, 431 and 432) indicating a direction in which an adjacent marker is present, and the adjacent marker specifying means specifies, as the adjacent marker, a second marker (for example, 431 or 432) present in a direction indicated by the indicator of a first marker (for example, 401m).

According to this embodiment, it is possible to prevent a virtual line from being set between markers that are not originally adjacent to each other.

14. In the autonomous work machine (for example, 10) of the embodiments described above, an acquisition means that acquires trajectory information (for example, a trajectory along an arrow in FIG. 4C) of the autonomous work machine by causing the autonomous work machine to travel along markers that are arranged is further provided, and the adjacent marker specifying means specifies, as the adjacent markers, two markers matching the trajectory information among the plurality of markers.

According to this embodiment, it is possible to prevent a virtual line from being set between markers that do not match the trajectory information and are not originally adjacent to each other.

15. In the autonomous work machine (for example, 10) of the embodiments described above, an acquisition means that acquires boundary information (for example, 475 and 476) of the work area designated on a map including the work area is further provided, and the adjacent marker specifying means specifies, as the adjacent markers, two markers matching the boundary information among the plurality of markers.

According to this embodiment, it is possible to prevent a virtual line from being set between markers that do not match the boundary information and are not originally adjacent to each other.

16. In the autonomous work machine (for example, 10) of the embodiments described above, the boundary information is arrangement information (for example, 476) of a plurality of markers arranged at a boundary of the work area, or information (for example, 475) of a boundary line indicating a boundary of the work area.

According to this embodiment, it is possible to acquire arrangement information of markers designated on a map and information of boundary lines.

17. In the autonomous work machine (for example, 10) of the embodiments described above,
the plurality of markers include a plurality of first type of markers (for example, 483) defining an outer edge of the work area, and a plurality of second type of markers (for example, 484) defining an inner region that is included in an inside of the outer edge and excluded from the work area, and
the adjacent marker specifying means specifies the first type of markers and the second type of markers as not being the adjacent markers.

According to this embodiment, it is possible to prevent a virtual line from being set between a marker defining the outer edge and a marker defining the inner region (island).

18. In the autonomous work machine (for example, 10) of the embodiments described above,
the plurality of markers include a plurality of first type of markers (for example, 491*a* to 491*e*) arranged at first distance intervals, and a plurality of second type of markers (for example, 492*a* to 492*f*) arranged at second distance intervals smaller than the first distance intervals, and
in a case where the second type of marker is present between two of the first type of markers among the plurality of first type of markers, the adjacent marker specifying means specifies the two of the first type of markers as the adjacent markers.

According to this embodiment, it is possible to prevent the autonomous work machine from deviating to the outside of the work area even in a region having a complicated shape.

19. In the autonomous work machine (for example, 10) of the embodiments described above,
a route setting means that sets a travel route of the autonomous work machine is further provided, and
the route setting means sets the travel route such that the virtual line is not present on the travel route.

According to this embodiment, it is possible to prevent the autonomous work machine from deviating to the outside of the work area in the case where it is necessary to travel to some predetermined position.

20. In the autonomous work machine (for example, 10) of the embodiments described above,
the travel route is a travel route for returning to a station.

According to this embodiment, it is possible to prevent the autonomous work machine from deviating to the outside of the work area when the autonomous work machine returns to the station.

21. In the autonomous work machine (for example, 10) of the embodiments described above,
a position specifying means (for example, 48) that specifies a current position of the autonomous work machine is further provided, and
the control means controls the autonomous work machine based on information on the virtual line and the current position of the autonomous work machine specified by the position specifying means.

According to this embodiment, it is possible to prevent the autonomous work machine from deviating to the region beyond the virtual line.

22. In the autonomous work machine (for example, 10) of the embodiments described above,
the control means reflects at least one of the marker position information (for example, 901*a* to 901*w*) and the information on the virtual line on the map information (for example, 900) of the work area.

According to this embodiment, it is possible to generate map information reflecting marker position information and information on a virtual line.

23. In the autonomous work machine (for example, 10) of the embodiments described above,
the control means presents, to a user, the map information on which at least one of the marker position information and the information on the virtual line is reflected.

According to this embodiment, the user can recognize the generated map information.

24. In the autonomous work machine (for example, 10) of the embodiments described above,
the control means transmits, to a communication terminal (for example, 470) of a user, the map information on which at least one of the marker position information and the information on the virtual line is reflected.

According to this embodiment, it is possible to easily check the generated map information via the communication terminal held by the user.

25. A control method for the autonomous work machine (for example, 10) of the embodiments described above is
a control method for an autonomous work machine that works in a work area, and includes
a detection step for detecting a plurality of markers arranged to define the work area,
a specifying step for specifying marker information based on a detection result of the detection step,
a setting step for setting a virtual line connecting the plurality of markers based on the marker information specified in the specifying step, and
a control step for controlling the autonomous work machine such that the autonomous work machine does not deviate to a region beyond the virtual line set in the setting step.

According to this embodiment, it is possible to control a work machine using markers that do not need to be individually distinguished. For example, the work machine can be controlled using the same type of marker.

26. A non-transitory computer readable storage medium storing a program according to the embodiment described above is
a storage medium storing a program for causing a computer to function as the autonomous work machine according to the embodiments described above.

According to this embodiment, the autonomous work machine according to the present invention can be realized by a computer.

According to the present invention, it is possible to control a work machine using markers that do not need to be individually distinguished.

The present invention is not limited to the above-described embodiments, and various changes and modifications can be made without departing from the spirit and scope of the present invention. Therefore, in order to make the scope of the present invention public, the following claims are attached.

What is claimed is:

1. An autonomous work machine that works in a work area, the autonomous work machine comprising:
at least one processor circuit with a memory comprising instructions that, when executed by the at least one processor circuit, cause the at least one processor circuit to at least:
detect a plurality of markers arranged to define the work area;

specify marker information based on a detection result of the detecting of the markers;
set a virtual line connecting the plurality of markers based on the specified marker information and
control the autonomous work machine such that the autonomous work machine does not deviate to a region beyond the virtual line,
wherein a time required for the autonomous work machine to reach the virtual line is calculated, and the autonomous work machine is controlled based on the calculated time.

2. The autonomous work machine according to claim 1, wherein the time is calculated based on a speed of the autonomous work machine and a distance from the autonomous work machine to the virtual line.

3. The autonomous work machine according to claim 1, wherein
the marker information includes distance information indicating a distance from the autonomous work machine to a marker, and
the virtual line is set based on the distance information.

4. The autonomous work machine according to claim 1, wherein
the marker information includes marker position information indicating a position coordinate of a marker, and
the virtual line is set based on the marker position information.

5. The autonomous work machine according to claim 4, wherein the instructions, when executed by the at least one processor circuit, further cause the at least one processor circuit to at least reflect at least one of the marker position information and the information on the virtual line on map information of the work area.

6. The autonomous work machine according to claim 5, wherein the instructions, when executed by the at least one processor circuit, further cause the at least one processor circuit to at least present, to a user, the map information on which at least one of the marker position information and the information on the virtual line is reflected.

7. The autonomous work machine according to claim 5, wherein the instructions, when executed by the at least one processor circuit, further cause the at least one processor circuit to at least transmit, to a communication terminal of a user, the map information on which at least one of the marker position information and the information on the virtual line is reflected.

8. The autonomous work machine according to claim 1, wherein the autonomous work machine is controlled to stop, move backward, or turn in a case where a distance from the autonomous work machine to the virtual line becomes equal to or less than a first threshold.

9. The autonomous work machine according to claim 8, wherein the autonomous work machine heading for the virtual line is controlled to decelerate in a case where the distance from the autonomous work machine to the virtual line becomes equal to or less than a second threshold larger than the first threshold.

10. The autonomous work machine according to claim 1, wherein the instructions, when executed by the at least one processor circuit, further cause the at least one processor circuit to at least:
specify two markers as adjacent markers among the plurality of markers detected, wherein
a virtual line is set between the two markers specified as the adjacent markers.

11. The autonomous work machine according to claim 10, wherein two markers are specified as adjacent markers when the two markers have a distance therebetween within a predetermined distance range among the plurality of markers.

12. The autonomous work machine according to claim 10, wherein in a case where another marker detected is present in a region beyond a line connecting the two markers, the two markers are not specified as the adjacent markers.

13. The autonomous work machine according to claim 10, wherein each marker includes an indicator indicating a direction in which an adjacent marker is present, and a second marker present in a direction indicated by the indicator of a first marker is specified as the adjacent marker.

14. The autonomous work machine according to claim 10, wherein the instructions, when executed by the at least one processor circuit, further cause the at least one processor circuit to at least:
acquire trajectory information of the autonomous work machine by causing the autonomous work machine to travel along markers that are arranged,
specify, as the adjacent markers, two markers matching the trajectory information among the plurality of markers.

15. The autonomous work machine according to claim 10, wherein the instructions, when executed by the at least one processor circuit, further cause the at least one processor circuit to at least:
acquire boundary information of the work area designated on a map including the work area,
specify, as the adjacent markers, two markers matching the boundary information among the plurality of markers.

16. The autonomous work machine according to claim 15, wherein the boundary information is arrangement information of a plurality of markers arranged at a boundary of the work area, or information of a boundary line indicating a boundary of the work area.

17. The autonomous work machine according to claim 10, wherein
the plurality of markers include a plurality of first type of markers defining an outer edge of the work area, and a plurality of second type of markers defining an inner region that is included in an inside of the outer edge and excluded from the work area, and
wherein the first type of markers and the second type of markers are not specified as being the adjacent markers.

18. The autonomous work machine according to claim 10, wherein
the plurality of markers include a plurality of first type of markers arranged at first distance intervals, and a plurality of second type of markers arranged at second distance intervals smaller than the first distance intervals, and
in a case where the second type of marker is present between two of the first type of markers among the plurality of first type of markers, the two of the first type of markers are specified as the adjacent markers.

19. The autonomous work machine according to claim 1, wherein the instructions, when executed by the at least one processor circuit, further cause the at least one processor circuit to at least:
set a travel route of the autonomous work machine, wherein
the travel route is set such that the virtual line is not present on the travel route.

20. The autonomous work machine according to claim 19, wherein the travel route is a travel route for returning to a station.

21. The autonomous work machine according to claim 1, wherein the instructions, when executed by the at least one processor circuit, further cause the at least one processor circuit to at least:
specify a current position of the autonomous work machine, wherein
the autonomous work machine is controlled based on information on the virtual line and the current position of the autonomous work machine.

22. A control method for an autonomous work machine that works in a work area, the control method comprising:
detecting a plurality of markers arranged to define the work area;
specifying marker information based on a detection result in the detecting;
setting a virtual line connecting the plurality of markers based on the marker information specified in the specifying; and
controlling the autonomous work machine such that the autonomous work machine does not deviate to a region beyond the virtual line set in the setting,
wherein a time required for the autonomous work machine to reach the virtual line is calculated, and the autonomous work machine is controlled based on the calculated time.

23. A non-transitory computer readable storage medium storing a program for causing a computer to execute a control method for an autonomous work machine that works in a work area, the control method comprising:
detecting a plurality of markers arranged to define the work area;
specifying marker information based on a detection result in the detecting;
setting a virtual line connecting the plurality of markers based on the marker information specified in the specifying; and
controlling the autonomous work machine such that the autonomous work machine does not deviate to a region beyond the virtual line set in the setting,
wherein a time required for the autonomous work machine to reach the virtual line is calculated, and the autonomous work machine is controlled based on the calculated time.

24. A control method for an autonomous work machine that works in a work area, the control method comprising:
detecting a plurality of markers arranged to define the work area;
specifying marker information based on a detection result of the detecting of the markers;
setting a virtual line connecting the plurality of markers based on the specified marker information; and
controlling the autonomous work machine such that the autonomous work machine does not deviate to a region beyond the virtual line;
measuring a moving distance of the autonomous work machine,
wherein the controlling further comprises:
calculating a distance from the autonomous work machine to the virtual line based on the marker information, and
controlling the autonomous work machine based on the calculated distance and the moving distance from a position of the autonomous work machine where the distance has been calculated.

25. A non-transitory computer readable storage medium storing a program for causing a computer to execute a control method for an autonomous work machine that works in a work area, the control method comprising:
detecting a plurality of markers arranged to define the work area;
specifying marker information based on a detection result of the detecting of the markers;
setting a virtual line connecting the plurality of markers based on the specified marker information; and
controlling the autonomous work machine such that the autonomous work machine does not deviate to a region beyond the virtual line;
measuring a moving distance of the autonomous work machine,
wherein the controlling further comprises:
calculating a distance from the autonomous work machine to the virtual line based on the marker information, and
controlling the autonomous work machine based on the calculated distance and the moving distance from a position of the autonomous work machine where the distance has been calculated.

26. An autonomous work machine that works in a work area, the autonomous work machine comprising:
at least one processor circuit with a memory comprising instructions that, when executed by the at least one processor circuit, cause the at least one processor circuit to at least:
detect a plurality of markers arranged to define the work area;
specify marker information based on a detection result of the detecting of the markers;
set a virtual line connecting the plurality of markers based on the specified marker information; and
control the autonomous work machine such that the autonomous work machine does not deviate to a region beyond the virtual line;
measure a moving distance of the autonomous work machine,
wherein
a distance is calculated from the autonomous work machine to the virtual line based on the marker information, and
the autonomous work machine is controlled based on the calculated distance and the moving distance from a position of the autonomous work machine where the distance has been calculated.

* * * * *